United States Patent
Chu et al.

(10) Patent No.: US 11,132,179 B1
(45) Date of Patent: Sep. 28, 2021

(54) MICROAPP FUNCTIONALITY RECOMMENDATIONS WITH CROSS-APPLICATION ACTIVITY CORRELATION

(71) Applicant: Citrix Systems, Inc., Ft. Lauderdale, FL (US)

(72) Inventors: Xiaolu Chu, Nanjing (CN); Dan Hu, Nanjing (CN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 16/862,781

(22) Filed: Apr. 30, 2020

Related U.S. Application Data

(63) Continuation of application No. PCT/CN2020/081406, filed on Mar. 26, 2020.

(51) Int. Cl.
*G06F 9/44* (2018.01)
*G06F 8/20* (2018.01)
(Continued)

(52) U.S. Cl.
CPC .............. *G06F 8/22* (2013.01); *G06F 8/77* (2013.01); *G06F 16/9535* (2019.01); *G06Q 30/0631* (2013.01)

(58) Field of Classification Search
CPC ........................................................ G06F 9/44
See application file for complete search history.

(56) References Cited

U.S. PATENT DOCUMENTS

| 8,312,450 | B2 | 11/2012 | Gangadharappa et al. |
| 9,110,685 | B2 | 8/2015 | Suryanarayana et al. |

(Continued)

FOREIGN PATENT DOCUMENTS

| CN | 102054004 | 5/2011 |
| CN | 106101250 | 11/2016 |

(Continued)

OTHER PUBLICATIONS

International Search Report dated Dec. 25, 2020 for International Application No. PCT/CN2020/081406, 4 pages.
(Continued)

*Primary Examiner* — Jae U Jeon
(74) *Attorney, Agent, or Firm* — Finch & Maloney PLLC

(57) ABSTRACT

A method for generating microapp recommendations comprises receiving observational data that characterizes interactions between users and applications. The method further comprises defining a set of correlation trees based on the received observational data. Each correlation tree in the set represents a sequence of interactions between one of the users and one or more of the applications. The set includes a first quantity of correlation trees. The method further comprises identifying a subset of similar correlation trees, each of which is included in the set. The subset includes a second quantity of correlation trees that is less than the first quantity. The method further comprises making a determination that the second quantity is greater than a threshold quantity. The method further comprises, in response to making the determination, generating a microapp recommendation based on the sequence of interactions represented by a correlation tree that is representative of the subset.

20 Claims, 11 Drawing Sheets

(51) Int. Cl.
    *G06F 8/77*         (2018.01)
    *G06Q 30/06*      (2012.01)
    *G06F 16/9535*    (2019.01)

(56) References Cited

U.S. PATENT DOCUMENTS

| | | |
|---|---|---|
| 9,280,252 B1 | 3/2016 | Brandmaier et al. |
| 9,405,665 B1 | 8/2016 | Shashi et al. |
| 9,471,624 B1 | 10/2016 | Patil et al. |
| 10,621,062 B2 | 4/2020 | Ligman et al. |
| 10,817,270 B2 | 10/2020 | Straub et al. |
| 10,848,500 B2 | 11/2020 | Bhattacharya et al. |
| 2006/0117059 A1* | 6/2006 | Freeman, Jr. ....... G06F 11/3447 |
| 2012/0278736 A1* | 11/2012 | Tran ..................... H04W 4/029 |
| | | 715/753 |
| 2013/0227386 A1 | 8/2013 | Ferlin |
| 2013/0251126 A1* | 9/2013 | Hollander ........... H04M 3/5166 |
| | | 379/93.17 |
| 2013/0326499 A1 | 12/2013 | Mowatt et al. |
| 2014/0020068 A1 | 1/2014 | Desai et al. |
| 2014/0351052 A1 | 11/2014 | Khalsa et al. |
| 2015/0026660 A1 | 1/2015 | Vaidyanathan et al. |
| 2015/0356495 A1 | 12/2015 | Virdi et al. |
| 2017/0212650 A1 | 7/2017 | Sinyagin et al. |
| 2017/0277396 A1 | 9/2017 | Chung et al. |
| 2018/0081986 A1* | 3/2018 | Sitik ..................... G06N 20/00 |
| 2019/0065177 A1 | 2/2019 | Khoongumjorn et al. |
| 2019/0324890 A1 | 10/2019 | Li et al. |
| 2020/0026502 A1 | 1/2020 | Moore et al. |

FOREIGN PATENT DOCUMENTS

| | | |
|---|---|---|
| CN | 106201624 | 12/2016 |
| CN | 109117164 A | 1/2019 |
| CN | 110007986 | 7/2019 |
| CN | 110069463 | 7/2019 |
| CN | 110806975 | 2/2020 |

OTHER PUBLICATIONS

Written Opinion of the International Searching Authority dated Dec. 25, 2020 for International Application No. PCT/CN2020/081406, 4 pages.

International Search Report dated Dec. 29, 2020 for International Application No. PCT/CN2020/084144, 4 pages.

Written Opinion of the International Searching Authority dated Dec. 29, 2020 for International Application No. PCT/CN2020/084144, 4 pages.

Zhu Han; et al., "Learning Tree-based Deep Model for Recommender Systems", Applied Data Science Track Paper, KDD 2018, The 24th ACM SIGKDD International Conference on Knowledge Discovery Data Mining, Aug. 19-23, 2018, 10 pages.

"About the MDX Toolkit", retrieved from https://docs.citrix.com/en-us/mdx-toolkit/about-mdx-toolkit.html (Oct. 29, 2019).

"Citrix Insight Services", retrieved from https://docs.citrix.com/en-us/citrix-virtual-apps-desktops/manage-deployment/cis.html (Dec. 18, 2019).

"Citrix Workspace Intelligence—Customer FAQ", retrieved from https://www.citrix.com/content/dam/citrix/en_us/documents/reference-material/citrix-workspace-intelligence-customer-faq.pdf (Oct. 2019).

"Microapps", retrieved from https://docs.citrix.com/en-us/citrix-microapps.html (Jan. 9, 2020).

Ruiz, "Citrix Workspace Microapps Service", retrieved from https://docs.citrix.com/en-us/tech-zone/learn/tech-briefs/workspace-microapps.html (Feb. 4, 2020).

U.S. Appl. No. 15/931,747, filed May 14, 2020.

Wiffen, "Building a simple Citrix microapp that shows blog posts from a WordPress RSS feed", The Curious Kabri (Blog), retrieved from https://kabri.uk/2019/12/18/building-a-simple-citrix-microapp-that-shows-blog-posts-from-a-wordpress-rss-feed/ (posted Dec. 18, 2019).

Xu, "An Algorithm for Comparing Similarity Between Two Trees", thesis submitted in partial fulfillment of the requirements for the degree of Master of Science in the Department of Computer Science in the Graduate School of Duke University, retrieved from https://arxiv.org/pdf/1508.03381.pdf (submitted Aug. 13, 2015).

International Search Report and Written Opinion dated Jun. 24, 2021 for International Application No. PCT/US2021/026946, 12 pages.

* cited by examiner

MICROAPP FUNCTIONALITY RECOMMENDATIONS WITH CROSS-APPLICATION ACTIVITY CORRELATION

CROSS-REFERENCE TO RELATED APPLICATION

This application is a continuation of International Application PCT/CN2020/081406 (filed 26 Mar. 2020), the entire disclosure of which is hereby incorporated by reference herein.

BACKGROUND

A digital workspace is a software framework designed to deliver and manage a user's applications, data, and desktops in a consistent and secure manner, regardless of the user's device or location. Digital workspaces enhance the user experience by streamlining and automating those tasks that a user performs frequently, such as approving expense reports, confirming calendar appointments, submitting helpdesk tickets, and reviewing vacation requests. A digital workspace allows users to access functionality provided by multiple enterprise applications—including "software as a service" (SaaS) applications, web applications, desktop applications, and proprietary applications—through a single interface. A digital workspace also extends the capabilities of these applications through the use of microapps. A microapp synchronizes data from complex enterprise applications to streamline functionality, and can therefore be understood as a streamlined use case that users can access from within a digital workspace.

SUMMARY

In a first example implementation, a method for generating microapp recommendations is provided. The method comprises receiving observational data that characterizes interactions between a plurality of users and a plurality of applications. The method further comprises defining a set of correlation trees based on the received observational data. Each correlation tree in the set represents a sequence of interactions between one of the users and one or more of the applications. The set includes a first quantity of correlation trees. The method further comprises identifying a subset of similar correlation trees, each of which is included in the set. The subset includes a second quantity of correlation trees that is less than the first quantity. The method further comprises making a determination that the second quantity is greater than a threshold quantity. The method further comprises, in response to making the determination, generating a microapp recommendation based on the sequence of interactions represented by a correlation tree that is representative of the subset.

In a second example implementation, generating the microapp recommendation further comprises generating machine-readable instructions, that when executed, cause the sequence of interactions represented by the representative correlation tree to be invoked.

In a third example implementation, the method of the first example implementation further comprises extracting a plurality of frequent action sets from the set of correlation trees; identifying a causal relationship between a particular one of the frequent action sets and a subsequent frequent action, wherein the subsequent frequent action is associated with a confidence parameter that represents how often the subsequent frequent action follows the particular frequent action set; and in response to determining that the confidence parameter exceeds a threshold confidence, generating a microapp recommendation that includes the subsequent frequent action.

In a fourth example implementation, the sequence of interactions represented by a particular one of the correlation trees in the set includes a user authentication interaction, a user data entry action, and a logoff interaction.

In a fifth example implementation, identifying the subset of similar correlation trees further comprises (a) identifying a centroid of the similar correlation trees in the subset; and (b) determining distances between each of the similar correlation trees in the subset and the centroid, wherein each of the distances is less than a threshold distance.

In a sixth example implementation, the method of the first example implementation further comprises determining distances between a particular one of the similar correlation trees in the subset and each of the other similar correlation trees in the subset, wherein each of the distances is less than a threshold distance.

In a seventh example implementation, the set of correlation trees includes a single-application correlation tree that represents a sequence of interactions between one of the users and one of the applications; and a cross-application correlation tree that represents a sequence of interactions between one of the users and at least two different applications.

In an eighth example implementation, the method of the first example implementation further comprises identifying a liaison point that links two of the correlation trees in the set, wherein the two linked correlation trees represent functionality provided by first and second applications, and wherein the liaison point represents data passing from the first application to the second application; generating a cross-application correlation tree that represents a sequence of interactions between one of the users and the first and second applications; and including the cross-application correlation tree in the defined set of correlation trees.

In a ninth example implementation, the method of the first example implementation further comprises identifying a liaison point that links two of the correlation trees in the set, wherein the two linked correlation trees represent functionality provided by first and second applications, and wherein the liaison point represents a copy operation in the first application and a paste operation in the second application.

In a tenth example implementation, a system comprises a digital workspace server. The digital workspace server includes a memory and at least one processor coupled to the memory. The digital workspace server is configured to generate microapp recommendations by receiving observational data that characterizes interactions between a plurality of users and a plurality of applications. The digital workspace server is further configured to generate microapp recommendations by defining a set of correlation trees based on the received observational data. Each correlation tree in the set represents a sequence of interactions between one of the users and one or more of the applications. The digital workspace server is further configured to generate microapp recommendations by extracting a plurality of frequent action sets from the set of correlation trees. The digital workspace server is further configured to generate microapp recommendations by identifying a causal relationship between a particular one of the frequent action sets and a subsequent frequent action. The subsequent frequent action is associated with a confidence parameter that represents how often the subsequent frequent action follows the particular frequent action set. The digital workspace server is further configured to generate microapp recommendations by, in response to determining that the confidence parameter exceeds a threshold confidence, generating a microapp recommendation that includes the subsequent frequent action.

In an eleventh example implementation, (a) the digital workspace server is further configured to generate microapp recommendations by linking two of the defined correlation trees; (b) a first one of the linked correlation trees includes a liaison point that represents a first action taken with respect to a data element; and (c) a second one of the linked correlation trees includes a second action taken with respect to the data element.

In a twelfth example implementation, the digital workspace server is further configured to generate microapp recommendations by identifying a subset of similar correlation trees, each of which is included in the set; making a determination that there are more than a threshold quantity of correlation trees in the subset; and in response to making the determination, generating a microapp recommendation based on the sequence of interactions represented by a correlation tree that is representative of the subset.

In a thirteenth example implementation, generating the microapp recommendation further comprises displaying, in a user interface, a representation of the subsequent frequent action.

In a fourteenth example implementation, each frequent action set is associated with a support parameter that represents a frequency with which the frequent action set is observed.

In a fifteenth example implementation, a non-transitory computer readable medium stores processor executable instructions to generate microapp recommendations. The processor executable instructions comprise instructions to receive observational data that characterizes interactions between a plurality of users and a plurality of applications. The processor executable instructions further comprise instructions to define a set of correlation trees based on the received observational data. Each correlation tree in the set represents a sequence of interactions between one of the users and one or more of the applications. The set includes a first quantity of correlation trees. The processor executable instructions further comprise instructions to identify a subset of similar correlation trees, each of which is included in the set. The subset includes a second quantity of correlation trees that is less than the first quantity. The processor executable instructions further comprise instructions to make a determination that the second quantity is greater than a threshold quantity. The processor executable instructions further comprise instructions to, in response to making the determination, generate a microapp recommendation based on the sequence of interactions corresponding to a correlation tree that is representative of the subset.

In a sixteenth example implementation, the processor executable instructions further comprise instructions to: identify start and end points of a particular sequence of interactions; and identify a plurality of user actions occurring between the start and end points.

In a seventeenth example implementation, the processor executable instructions further comprise instructions to save data representing the set of correlation trees in a tree database.

In an eighteenth example implementation, (a) the processor executable instructions further comprise instructions to identify a start point of a particular sequence of interactions; and (b) the start point is selected from a group consisting of a user authentication action and a uniform resource locator submission.

In a nineteenth example implementation, (a) the processor executable instructions further comprise instructions to identify an end point of a particular sequence of interactions; and (b) the end point is selected from a group consisting of a user logoff action, a page close action, and a detected activity timeout event.

In a twentieth example implementation, the processor executable instructions further comprise instructions to identify an end point of a first sequence of interactions; identify a start point of a second sequence of interactions; identify a data object that is operated on by both the start and end points; and in response to identifying the data object, designate the end point of the first sequence of interactions as a liaison point between the first and second sequences.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this disclosure. However, the figures are not intended as a definition of the limits of any particular example. The figures, together with the remainder of this disclosure, serve to explain principles and operations of the described and claimed aspects. In the figures, each identical or nearly identical component that is illustrated is represented by a like reference numeral. For purposes of clarity, every component may not be labeled in every figure.

DETAILED DESCRIPTION

Figure 1:
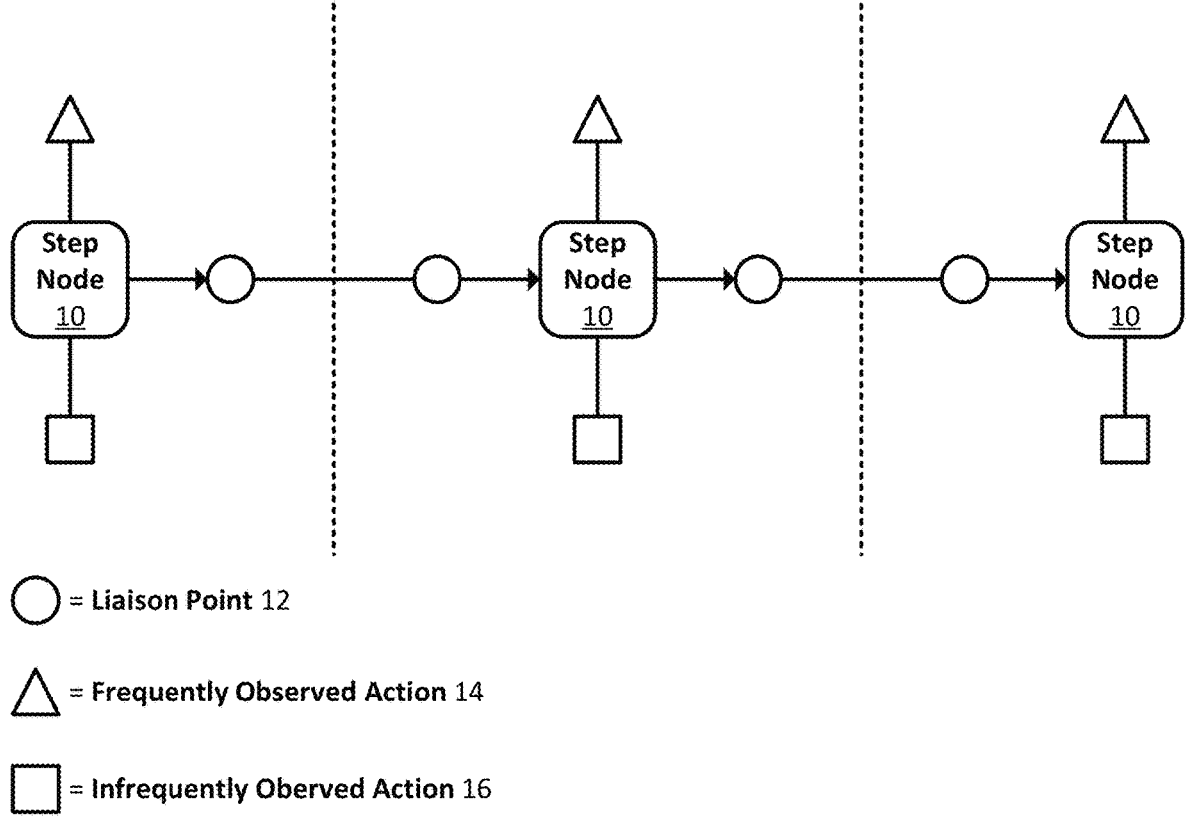
FIG. 1 is a block diagram schematically illustrating a sequence of workflow operations that are connected by liaison points.

As noted above, a digital workspace allows users to access functionality provided by multiple applications through a single user interface. Microapps synchronize data from these applications to streamline the user experience within a digital workspace. Microapps therefore allow a user to view information and perform actions without launching the underlying application or toggling to a different interface. From a conceptual standpoint, microapps can thus be understood as unbundling the functionality provided by a user's applications to provide the user with simplified actions within the digital workspace interface. User actions taken within a microapp serve as the basis for inputs provided to the user's underlying applications. These user actions are designed to address specific common problems and use cases quickly and easily, thereby increasing user productivity. Examples of such frequently invoked actions include approving expense reports, confirming calendar appointments, submitting helpdesk tickets, and reviewing vacation requests.

The wide-ranging productivity and usability benefits of microapps has not only led to rapid growth in the number of available microapps but has also resulted in the development of tools that make it easy for developers to create custom integrations. Such development tools streamline the process of extracting frequently invoked actions from a user's applications to his/her digital workspace. For example, prebuilt microapp action templates can be directly integrated into a user's digital workspace, while a microapp builder allows administrators to customize and deploy new microapps for legacy, proprietary, or other specialized SaaS applications. Tools such as these allow a list of "available actions" to be curated and presented to a user, thereby allowing the user to interact with an entire suite of diverse applications without ever leaving the digital workspace interface.

Existing microapp development tools therefore help administrators to develop and deploy a suite of microapps that is tailored to the needs of a particular workgroup. This development process remains heavily reliant on human knowledge and intuition to identify the workflows that microapps should facilitate. For example, to create useful microapp integrations, developers should know which applications are frequently used, and more specifically, what application functionality is frequently invoked by specific users. Developers should also know how functionality extends across different enterprise applications, such as occurs when a user makes a travel reservation using a first application and then emails a copy of the reservation confirmation using a second application. In a large organization it is difficult for administrators to curate this individualized usage data across workgroups, thus presenting an obstacle to the development of a useful suite of microapps.

In a more general sense, the functionality provided by a microapp and the underlying applications that a microapp leverages are often selected based on the subjective judgment of a developer, administrator, or other software engineer. It is often challenging for software engineers to make judgments with respect to which microapp functionality will most likely yield benefits in terms of improved efficiency and streamlined workflows. More specifically, software engineers charged with developing a digital workspace and the microapp functionality provided therein are often not aware of the application functionality that users in other fields see as most useful. For example, users in the financial services or healthcare industries will likely demand different functionality than software engineers or product managers. In other words, while developers may have great skill in generating and creating microapps, they often lack insight into the particular actions that the microapps should provide. A more analytical approach to evaluating user activity would therefore streamline the microapp development process by making it less reliant on human knowledge and intuition, as well as less reliant on the judgment and/or subjective assumptions of software developers and engineers.

In view of the foregoing, disclosed herein is a microapp recommendation framework that generates microapp functionality recommendations by analyzing observed user interaction sequences that involve one or more enterprise applications. In certain implementations, such a framework provides the ability to analytically identify a frequently invoked sequence of actions actually performed in the course of competing day-to-day tasks in different fields. This identified sequence of actions is sometimes referred to as a "critical path". In some cases the critical path may extend across multiple applications, in which case the microapp recommendation framework identifies one or more "liaison points" that represent actions that link functionality in two different applications. For example, a copy-paste action that is used to move data from one application to another serves as a liaison point between the two applications. Regardless of the number of applications involved, the identified sequence of actions can be provided as a recommendation to a microapp developer, or can be provided directly to a microapp builder. In other words, liaison points represent actions that can be automated or recommended in a microapp builder. The microapp recommendation framework disclosed herein also optionally enables identification of individual frequently invoked actions, independent of any overarching sequence. In some cases the recommended microapp functionality is approved by an administrator or other designated user before being deployed to a user's digital workspace.

FIG. 1 is a block diagram schematically illustrating a sequence of workflow step nodes 10 that are connected by liaison points 12. Step nodes 10 represent discrete stages of a workflow from which one or more actions can be taken. Liaison points 12 represent actions that, when invoked, advance the workflow from one step node to the next. The sequence established by liaison points 12 defines a critical path that can form the basis for recommended microapp functionality. As further illustrated in FIG. 1, additional actions be taken from step nodes 10, including frequently observed actions 14 and infrequently observed actions 16. Frequently observed actions 14 may additionally or alternatively form the basis for other recommended microapp functionality. The workflow illustrated in FIG. 1 is presented from a "user-centric" perspective, rather than from the perspective of any one application used in the workflow.

For instance, in one example workflow a supervisor receives and responds to a vacation request from a subordinate. The actions that the supervisor is observed to take in such a workflow can form the basis for recommended microapp functionality, as derived using the analytical techniques disclosed herein. For example, upon receiving the request, the supervisor may access a shared calendar, decide to approve or deny the request, and send a decision notification to the requestor. In this workflow, the point at which the supervisor receives the request can be understood as a first step node. The supervisor's action of accessing the shared calendar can be understood as a first liaison point. In some cases, this liaison point may represent cross-application functionality, such as when incoming data from a messaging application is provided to a scheduling application. The point at which the supervisor is presented with the shared calendar can be understood as a second step node. The supervisor's action of sending a notification to the requestor can be understood as a second liaison point, and the point at which the request has been approved or denied can be understood as a third step node. When the sequence of receiving the request, displaying a shared calendar, and sending a response notification is observed frequently, this sequence represents a critical path that forms the basis for recommended microapp functionality.

While this example vacation request workflow involves three step nodes linked by two liaison points, additional or fewer step nodes and liaison points may be implicated in other implementations. Moreover, the analytical techniques disclosed herein can also be used to identify other frequently observed actions that can form the basis for recommended microapp functionality, even when those actions leverage functionality provided by a single application. For example, in some cases it may be observed that the supervisor frequently sends a message to the human resources department after receiving a vacation request. Sending such a message can be understood as a frequently observed action that is taken from any of the step nodes that comprise the vacation request workflow. A wide variety of different types of frequently observed actions can form the basis for making a microapp functionality recommendation, including actions that are automated and actions that require human input. Some implementations of the microapp recommendation framework disclosed herein are able to distinguish between frequently observed actions that should form the basis for recommended microapp functionality and infrequently observed actions that should not form the basis for such recommendation. For example, if the supervisor is observed to have accessed the vacation requestor's performance reviews on only isolated occasions, the microapp recommendation framework can be configured to disregard such isolated observations when making microapp functionality recommendations.

A number of advantages may be derived from the various implementations of the microapp recommendation framework disclosed herein. For example, certain of the techniques disclosed herein rely on collecting and analyzing application use data from a large number of users working in a diverse range of use contexts. Machine learning techniques can be used to analyze this use data and extract patterns that form the basis for identifying frequently invoked actions and action sequences. The resulting microapp functionality recommendations thus rely on identifying and analyzing application usage patterns that could be difficult or even impossible for a human analyst to identify. Certain of the disclosed techniques also enable microapp functionality recommendations to be specifically tailored to a particular role and the application usage patterns associated with that role. Accurately making individually-tailored microapp recommendations may not be feasible for a human analyst, particularly in a large organization. Microapp functionality that is closely tailored to the needs of particular users and particular workgroups ultimately will lead to improved user experience and productivity.

Definitions

As used herein, the term "microapp" refers, in addition to its ordinary meaning, to a lightweight software application configured to provide a user with simplified access to specific functionality and/or data that is provided by one or more underlying applications. For example, microapps allow a user to view information and perform actions without launching or switching context to an underlying application. Microapps can be characterized as being "event driven" or "user initiated". Event driven microapps are invoked in response to detecting a certain event or condition, and can be configured to generate user notifications when something requires attention. For example, an event driven microapp might display a budget report in response to receiving an expense approval request or display a syllabus in response to the opening of a course registration period. User initiated microapps, on the other hand, are invoked in response to a user action, and act as a shortcut to frequently performed actions, such as approving expense reports, confirming calendar appointments, submitting helpdesk tickets, and reviewing vacation requests. Microapps streamline workflows by reducing context switching and eliminating the need to learn how to use complex applications.

Figure 7:
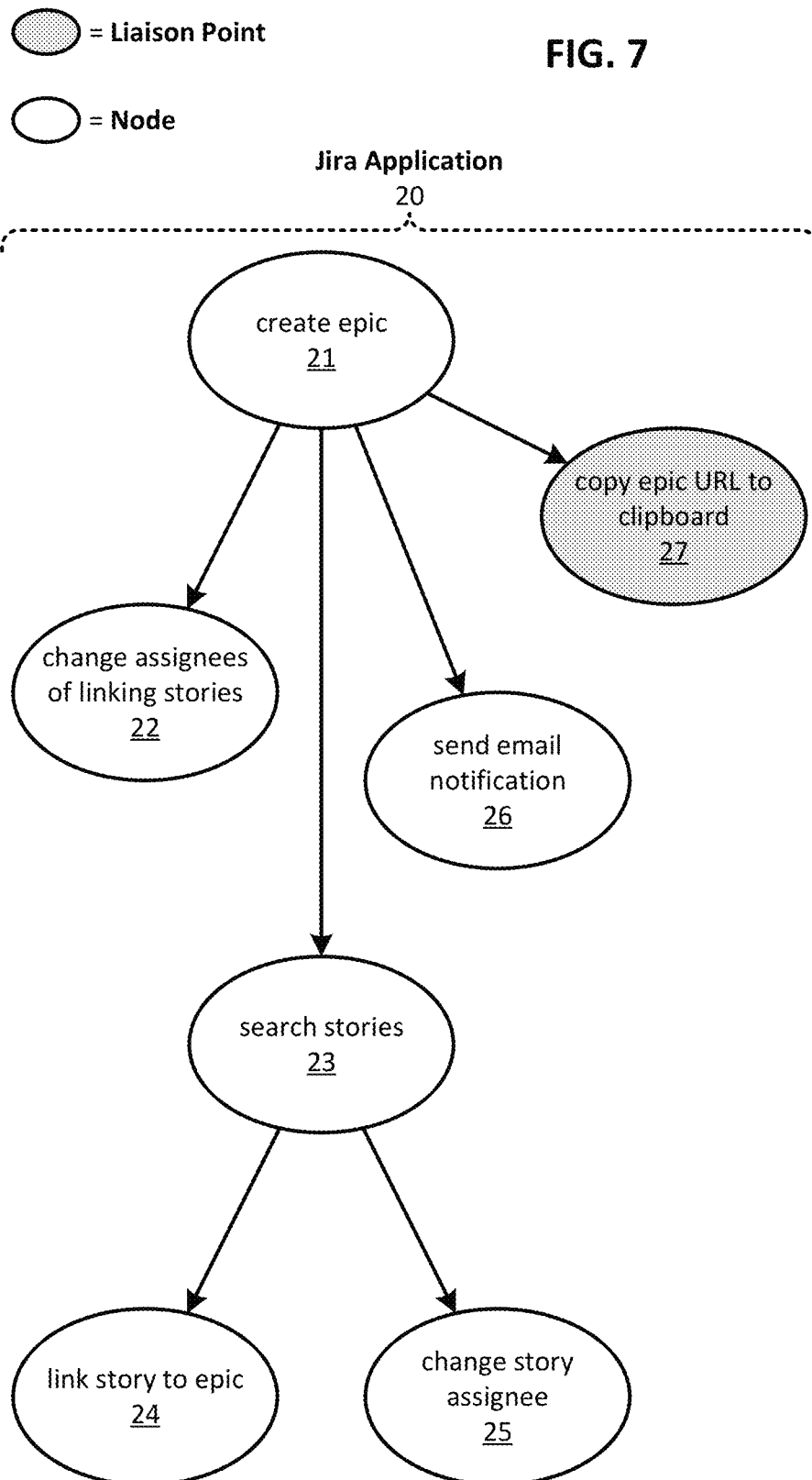
FIG. 7 is a single-application correlation tree that represents example user interaction sequences within a Jira application.
Figure 8:
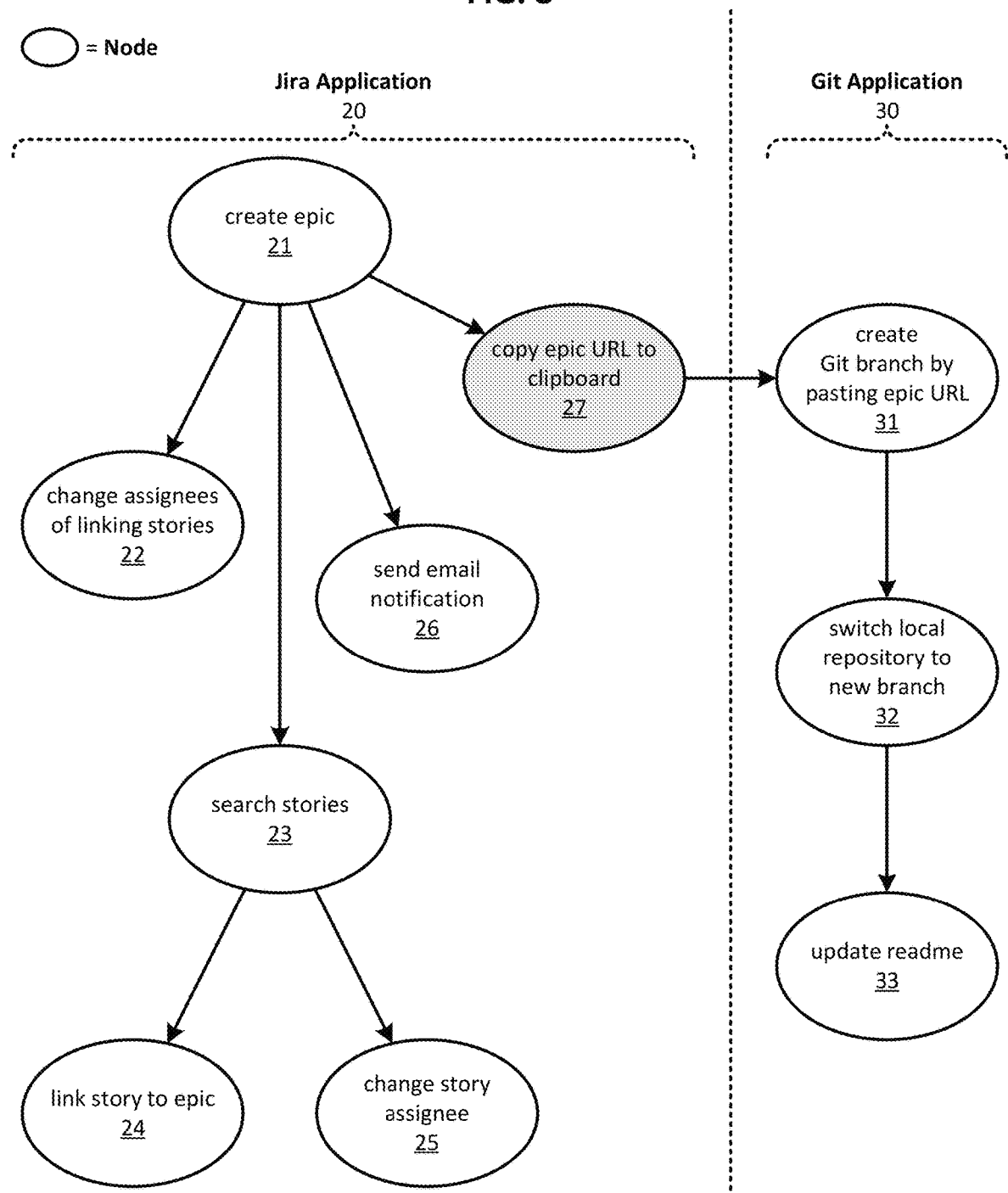
FIG. 8 is a cross-application correlation tree that represents example user interaction sequences within both a Jira application and a Git application.

As used herein, the term "correlation tree" refers, in addition to its ordinary meaning, to data that represents one or more action sequences performed by a software application. In some cases a correlation tree represents a set of actions that are performed sequentially, one after another. In other cases a correlation tree represents multiple sets of actions, at least one of which is mutually exclusive to another. Such mutual exclusivity may occur where, for example, a user must choose between two mutually exclusive actions (for instance, delete or save a data object). Mutually exclusive actions can be represented by different branches of a single correlation tree. The actions may be performed by a single application ("single-application correlation tree") or multiple applications ("cross-application correlation tree"). A correlation tree is represented by data that can be stored in any suitable format, including in a machine-readable data structure, or as a human-readable schematic chart where actions are represented by nodes that are linked by edges. FIGS. 7 and 8 illustrate examples of correlation trees that are represented by human-readable schematic charts. The data used to represent a correlation tree can be saved in, for example, a distributed memory structure, a relational database, or any other suitable data structure.

As used herein, the term "liaison point" refers, in addition to its ordinary meaning, to a user action that forms a link between functionalities provided by one or more underlying applications. The linking functionality can be provided by a microapp. For example, a user may invoke a "copy" command in a notepad application, switch contexts to a web browser, and then invoke a "paste" command in the web browser. The "copy" command can be understood as a liaison point because it is a user action that links functionality provided by the notepad application with functionality provided by the web browser. In this example, a microapp can be generated that allows data to be quickly transferred from the notepad application to the web browser. Other example liaison points in a workflow include a logoff action, a page close action, a user input action, a file transfer action, and a hypertext markup language (HTML) action. A liaison point can be understood as linking functionality provided by different applications in a cross-application correlation tree.

System Architecture

Figure 2:
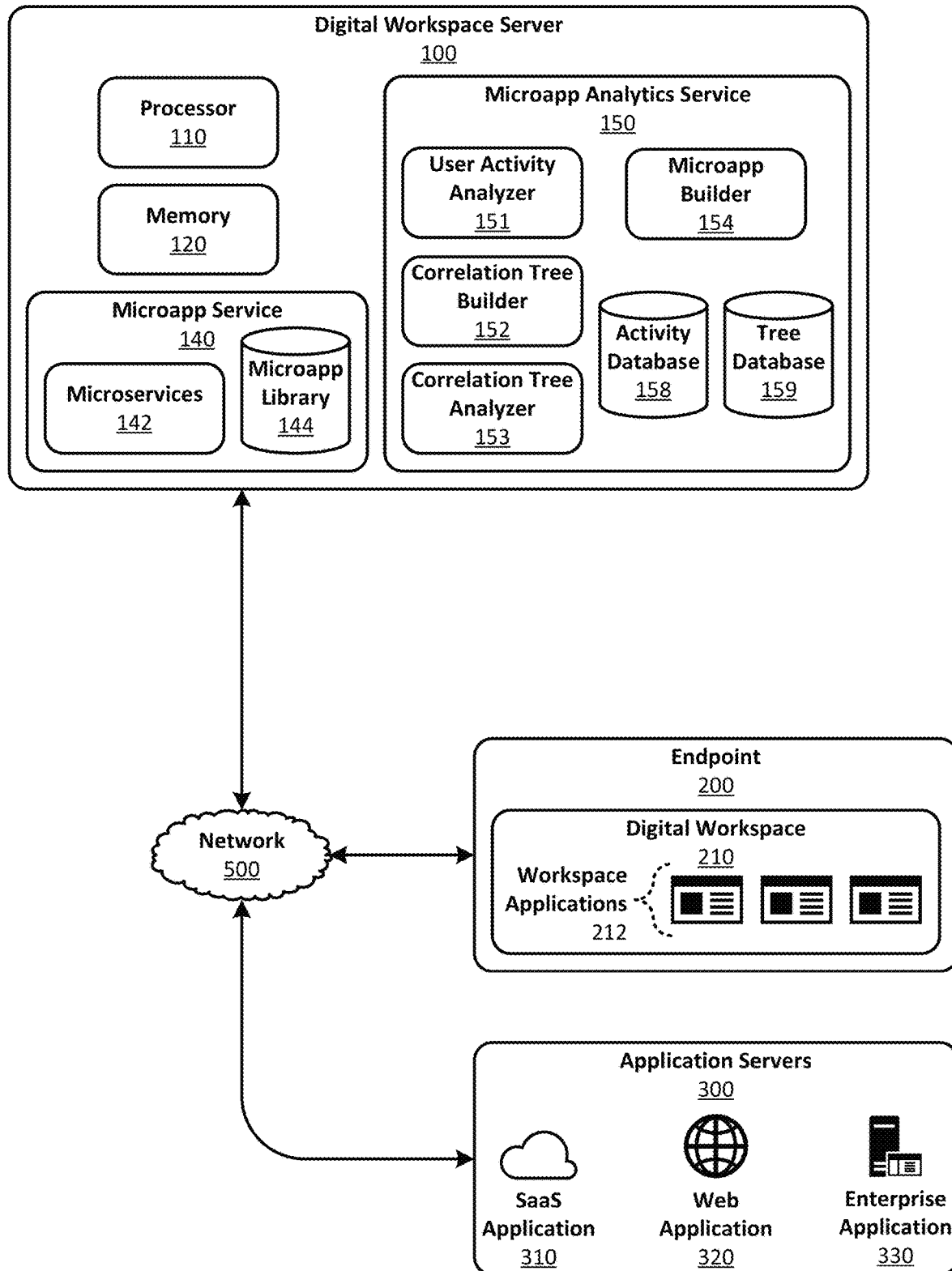
FIG. 2 is a block diagram schematically illustrating selected components of an example implementation of a microapp recommendation framework that generates microapp functionality recommendations by analyzing user interaction sequences within one or more applications.

FIG. 2 is a block diagram schematically illustrating selected components of an example implementation of a microapp recommendation framework 2000 that generates microapp functionality recommendations by analyzing user interaction sequences within one or more applications. Framework 2000 includes a digital workspace server 100 that is capable of analyzing how a user, associated with an endpoint 200, interacts with applications provided by one or more application servers 300. The users associated with endpoint 200 may exist by virtue of, for example, the user being logged into or authenticated to the endpoint. While only one endpoint and three example application servers are illustrated in FIG. 2 for clarity, it will be appreciated that, in general, framework 2000 is capable of analyzing interactions between an arbitrary number of endpoints and an arbitrary number of application servers. Digital workspace server 100, endpoint 200, and application servers 300 communicate with each other via a network 500. Network 500 may be a public network (such as the Internet) or a private network (such as a corporate intranet or other network with restricted access). Other embodiments may have fewer or more communication paths, networks, subcomponents, and/or resources depending on the granularity of a particular implementation. For example, in some implementations at least a portion of the application functionality is provided by one or more applications hosted locally at an endpoint. Thus references to application servers 300 should be understood as encompassing applications that are locally hosted at one or more endpoints. It should therefore be appreciated that the embodiments described and illustrated herein are not intended to be limited to the provision or exclusion of any particular services and/or resources.

Digital workspace server 100 is configured to generate microapp functionality recommendations by analyzing interactions between endpoint 200 and application servers 300. Digital workspace server 100 may comprise one or more of a variety of suitable computing devices, such as a desktop computer, a laptop computer, a workstation, an enterprise-class server computer, a tablet computer, or any other device capable of supporting the functionalities disclosed herein. A combination of different devices may be used in certain embodiments. As illustrated in FIG. 2, digital workspace server 100 includes one or more software modules configured to implement certain of the functionalities disclosed herein as well as hardware capable of enabling such implementation.

The implementing hardware may include, but is not limited to, a processor 110, memory 120, and any other suitable components that enable digital workspace server 100 to interact with other components of framework 2000 or human users. Examples of such other components include, but are not limited to, a communication module, a bus and/or interconnect, a display, a textual input device (such as a keyboard), a pointer-based input device (such as a mouse), a microphone, and a camera. For example, a communications module can include one or more interfaces to enable digital workspace server 100 to access a computer network such as a local area network, a wide area network, a personal area network, or the Internet through a variety of wired and/or wireless connections, including cellular connections.

Processor 110 can be implemented by one or more programmable processors to execute one or more executable instructions, such as a computer program, to perform functions disclosed herein. As used herein, the term "processor" describes circuitry that performs a function, an operation, or a sequence of operations. The function, operation, or sequence of operations can be hard coded into the circuitry or soft coded by way of instructions held in memory 120 and executed by the processor circuitry. Processor 110 can perform the function, operation, or sequence of operations using digital values and/or using analog signals. In some examples, processor 110 can be embodied in one or more application specific integrated circuits, microprocessors, digital signal processors, graphics processing units, microcontrollers, field programmable gate arrays, programmable logic arrays, multicore processors, or general-purpose computers with associated memory. Processor 110 can be analog, digital, or mixed. Processor 110 can be one or more physical processors, which in some cases may be remotely located from digital workspace server 100. A processor that includes multiple processor cores and/or multiple processors can provide functionality for parallel, simultaneous execution of instructions or for parallel, simultaneous execution of one instruction on more than one piece of data.

Memory 120 can be implemented using any suitable type of digital storage, such as one or more of a disk drive, a redundant array of independent disks, a flash memory device, or a random access memory (RAM) device. In certain embodiments memory 120 is used to store instructions that, when executed using processor 110, cause operations associated with the various modules described herein to be invoked. Memory 120 may include one or more types of RAM and/or a cache memory that can offer a faster response time than a main memory.

The implementing software, on the other hand, may include, but is not limited to, a microapp service 140, a microapp analytics service 150, and any other suitable components that enable digital workspace server 100 to perform the functionalities disclosed herein. Examples of such other components include, but are not limited to, a communication module and an operating system. In particular, a communication module can include any appropriate network chip or chipset which allows for wired or wireless connection to other components of digital workspace server 100 and/or to network 500. This enables digital workspace server 100 to communicate with other local and remote computing systems, services, and resources, examples of which include endpoint 200 and application servers 300. As another example, digital workspace server 100 may include any suitable operating system. In general, the techniques provided herein can be implemented without regard to the particular operating system provided in conjunction with digital workspace server 100, and therefore may also be implemented using any suitable existing or subsequently developed platform.

Still referring to the example embodiment illustrated in FIG. 2, microapp service 140 and microapp analytics service 150 are each implemented using a non-transitory computer readable medium (such as memory 120) and one or more processors (such as processor 110) of a computing apparatus. In such embodiments the non-transitory computer readable medium stores program instructions executable by the one or more processors to cause digital workspace server 100 to perform certain aspects of the techniques disclosed herein. Other embodiments may have fewer or more modules depending on the granularity of a particular implementation.

For example, in certain embodiments microapp service 140 provides the microapps and supporting services that enable a user to access data and functionality provided by one or more application servers 300. Ultimately, this framework allows a user to view information and perform actions without having to launch the underlying application or toggle to a different interface. To this end, microapp service 140 includes a plurality of microservices 142 as well as a microapp library 144 that stores the particular microapps. In certain implementations microapp service 140 is a single tenant service that creates, manages, and provides implementing services to support the microapps stored in microapp library 144. This is accomplished through periodic communications with, and data acquisitions from, application servers 300. In some implementations, microapp library 144 is hosted locally at digital workspace server 100, such as in memory 120, although in other implementations microapp library 144 is partially or wholly hosted in a networked storage repository.

Microapp service 140 includes one or more microservices 142 that provide implementing functionality to support execution of the microapps stored in microapp library 144. For example, an active data cache microservice is a single tenant service that can store configuration information and microapp data using a per-tenant database encryption key and per-tenant database credentials. A credential wallet microservice can store encrypted service credentials for applications provided by application servers 300, as well as user authentication tokens, such as OAuth2 tokens. A data integration provider microservice can (a) interact with application servers 300 to decrypt user credentials and (b) communicate with application servers 300 under the identity of the user. Such communications use the user's actual account to ensure that all actions are complaint with applicable data policies. A notification microservice processes notifications created in the course of interacting with application servers 300. Notifications can be stored in a database, served in a notification feed, and/or transmitted as push notifications. A notification microservice optionally includes content controls that are configurable to restrict exposure of sensitive content. It will be appreciated that the microservices described herein represent only a few examples of microservices that support the creation, administration, and execution of the microapps stored in microapp library 144. Additional or alternative microservices may be included in microapp service 140 in other embodiments.

Referring again to FIG. 2, microapp analytics service 150 processes observed interactions between endpoint 200 and application servers 300, builds correlation trees based on the observed interactions, and generates microapp functionality recommendations derived from the correlation trees. These recommendations can be provided to an administrator via a user interface, and/or can be used to automatically generate new microapps. To this end, in one implementation microapp analytics service 150 comprises a user activity analyzer 151, a correlation tree builder 152, a correlation tree analyzer 153, and a microapp builder 154. Each of these subcomponents can be implemented using a non-transitory computer readable medium that stores program instructions executable by processor 110 to cause microapp analytics service 150 to perform certain of the functionalities disclosed herein. Other embodiments may have fewer or more subcomponents depending on the granularity of a particular implementation. As illustrated in FIG. 2, in certain embodiments microapp analytics service 150 also includes storage resources such as an activity database 158 for storing data representing the observed interactions and a tree database 159 for storing data representing the correlation trees. Activity database 158 and tree database 159 can be hosted locally at digital workspace server 100, such as in memory 120, although in other embodiments such databases are partially or wholly hosted in a networked storage repository.

In an example implementation, user activity analyzer 151 is configured to detect and analyze interactions between a plurality of users (an example one of which is represented by endpoint 200) and a plurality of application servers 300. This can be accomplished, for example, using any suitable existing or subsequently developed software that is capable of monitoring user activity and compiling usage information that reflects the monitored activity. For example, in certain implementations user activity analyzer 151 comprises a browser plugin that is capable of capturing interactions between a user and a web browser. Examples of monitored interactions include, but are not limited to, authentication interactions; data entry interactions (including input provided via a pointing device or keyboard); data display and/or receipt interactions; application context switching interactions; logoff interactions; browser tab, page, and/or window close interactions; browser tab, page, and/or window open interactions; timeout detection; clipboard interactions (including cut, copy, and paste); and hypertext transfer protocol (HTTP) command interactions. In some cases data representing the monitored user activity is stored in activity database 158.

In an example implementation, correlation tree builder 152 is configured to generate, and optionally link, correlation trees based on the observed user activity. This can be accomplished, for example, by recognizing that a given user's activity corresponds to a sequence of actions that can be represented by a particular branch of a correlation tree. Multiple sequences of actions can be represented by a single correlation tree, for example with mutually exclusive actions being represented by different branches of a single correlation tree. A cross-application correlation tree can be generated by identifying nodes where common data exists in multiple applications, such as where data is copied from a first application and pasted into a second application. In some cases data representing one or more correlation trees is saved in tree database 159. The data used to represent a correlation tree can be saved in, for example, a distributed memory structure, a relational database, or any other suitable data structure.

In an example implementation, correlation tree analyzer 153 is configured to analyze a collection of correlation trees to identify frequently invoked actions and/or action sequences. The identified action sequences may involve a user interacting with one or more applications. Identifying frequently invoked actions can be accomplished, for example, by using association rule learning to extract frequent action sets from tree database 159. Similarly, a tree similarity process can be used to cluster similar correlation trees and thus identify frequently invoked action sequences. A frequently invoked action sequence provides insight into both the most frequently invoked actions, as well as the critical path that extends across multiple applications when actions in the multiple applications are concatenated. A simple example of such a critical path is a copy action invoked in a first application followed by a corresponding paste action invoked in a second application. The techniques disclosed herein allow such a critical path to be learned from the perspective of the user's workflow, rather than from the perspective of analyzing the operation of any one application.

The identified frequently invoked action sequences can form the basis for recommended microapp functionality. Both the frequently invoked user actions and the frequently invoked action sequences can be passed to microapp builder

154. In certain implementations microapp builder 154 can be configured to provide recommended microapp functionality to an administrator for approval. In other implementations microapp builder 154 can be configured to automatically generate new microapps based on the identified frequently invoked actions or action sequences. Generated microapps are optionally stored in a microapp repository.

As noted above, in certain embodiments endpoint 200 is embodied in a computing device that is used by the user. Examples of such a computing device include but are not limited to, a desktop computer, a laptop computer, a tablet computer, and a smartphone. Digital workspace server 100 and its components are configured to interact with a plurality of endpoints. In an example embodiment, the user interacts with a plurality of workspace applications 212 that are accessible through a digital workspace 210. It is the user's interactions with workspace applications 212 and/or application servers 300 that are analyzed by user activity analyzer 151 and that ultimately form the basis for recommended microapp functionality. Any generated microapps can be made available to the user through digital workspace 210, thereby allowing the user to view information and perform actions without launching (or switching context to) the underlying workspace applications 212. Workspace applications 212 can be provided by application servers 300 and/or can be provided locally at endpoint 200. For instance, example workspace applications 212 include a SaaS application 310, a web application 320, and an enterprise application 330, although any other suitable exiting or subsequently developed applications can be used as well, including proprietary applications and desktop applications.

Methodology—Overview

Figure 3:
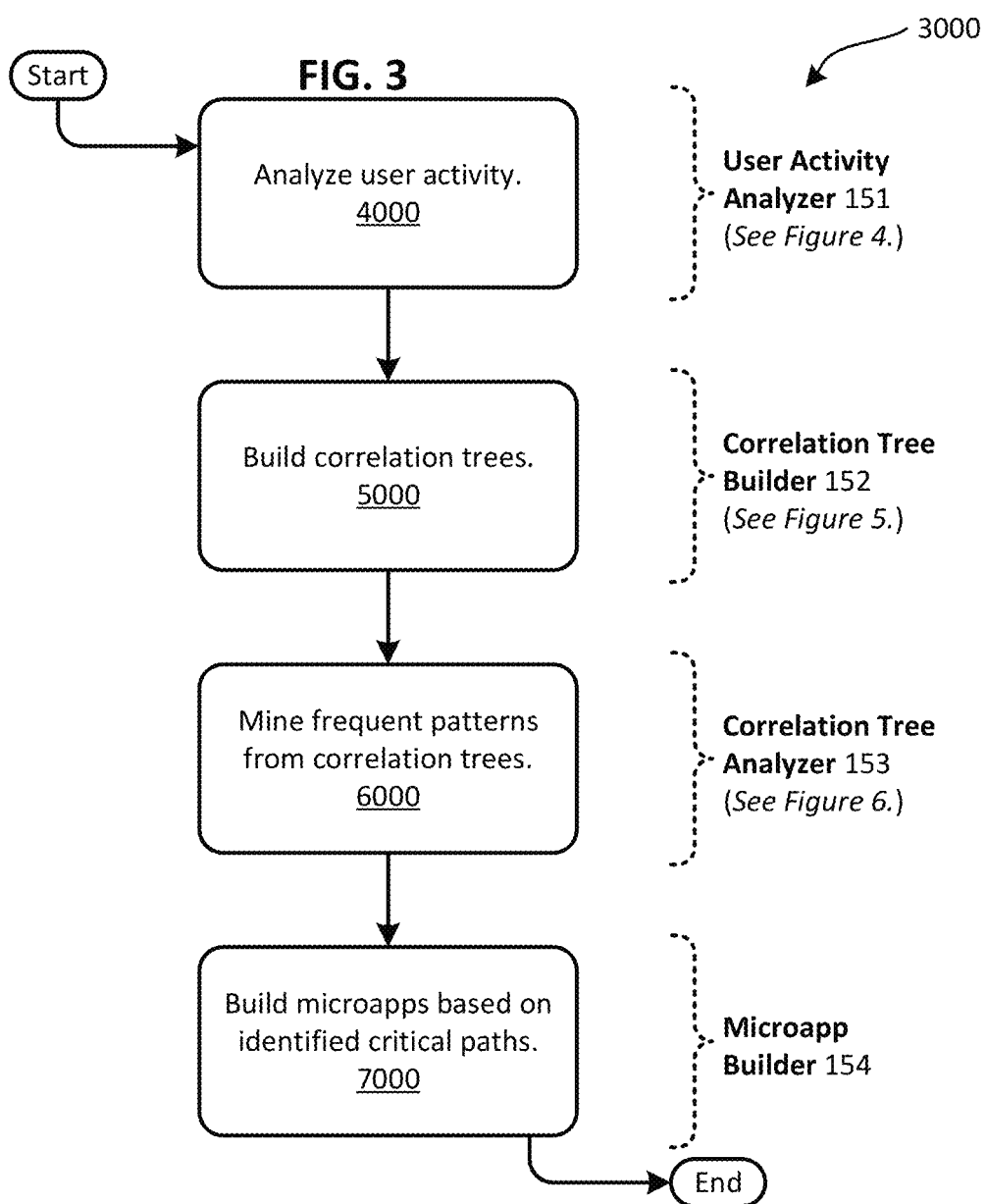
FIG. 3 is a flowchart illustrating an example method for generating microapp functionality recommendations by analyzing user interaction sequences within one or more applications.

FIG. 3 is a flowchart illustrating an example method 3000 for generating microapp functionality recommendations by analyzing user interaction sequences within one or more applications. Method 3000 starts with user activity analyzer 151 detecting and analyzing interactions between a plurality of users (for example as represented by endpoint 200) and a plurality of application servers 300. See reference numeral 4000 in FIG. 3. Additional details regarding the functionality provided by user activity analyzer 151 are provided in FIG. 4. Method 3000 further includes correlation tree builder 152 generating correlation trees based on the observed user interactions. See reference numeral 5000 in FIG. 3. Additional details regarding the functionality provided by correlation tree builder 152 are provided in FIG. 5. Method 3000 further includes correlation tree analyzer 153 mining patterns from a collection of correlation trees to identify frequently invoked actions and/or action sequences. See reference numeral 6000 in FIG. 3. Additional details regarding the functionality provided by correlation tree analyzer 153 are provided in FIG. 6. Method 3000 further includes microapp builder 154 building microapps and/or recommending microapp functionality based on the frequently invoked actions and/or action sequences. See reference numeral 7000 in FIG. 3. For example, a sequence of actions that one or more users are observed to have invoked frequently defines a critical path that can form the basis for recommended microapp functionality.

Figure 11:
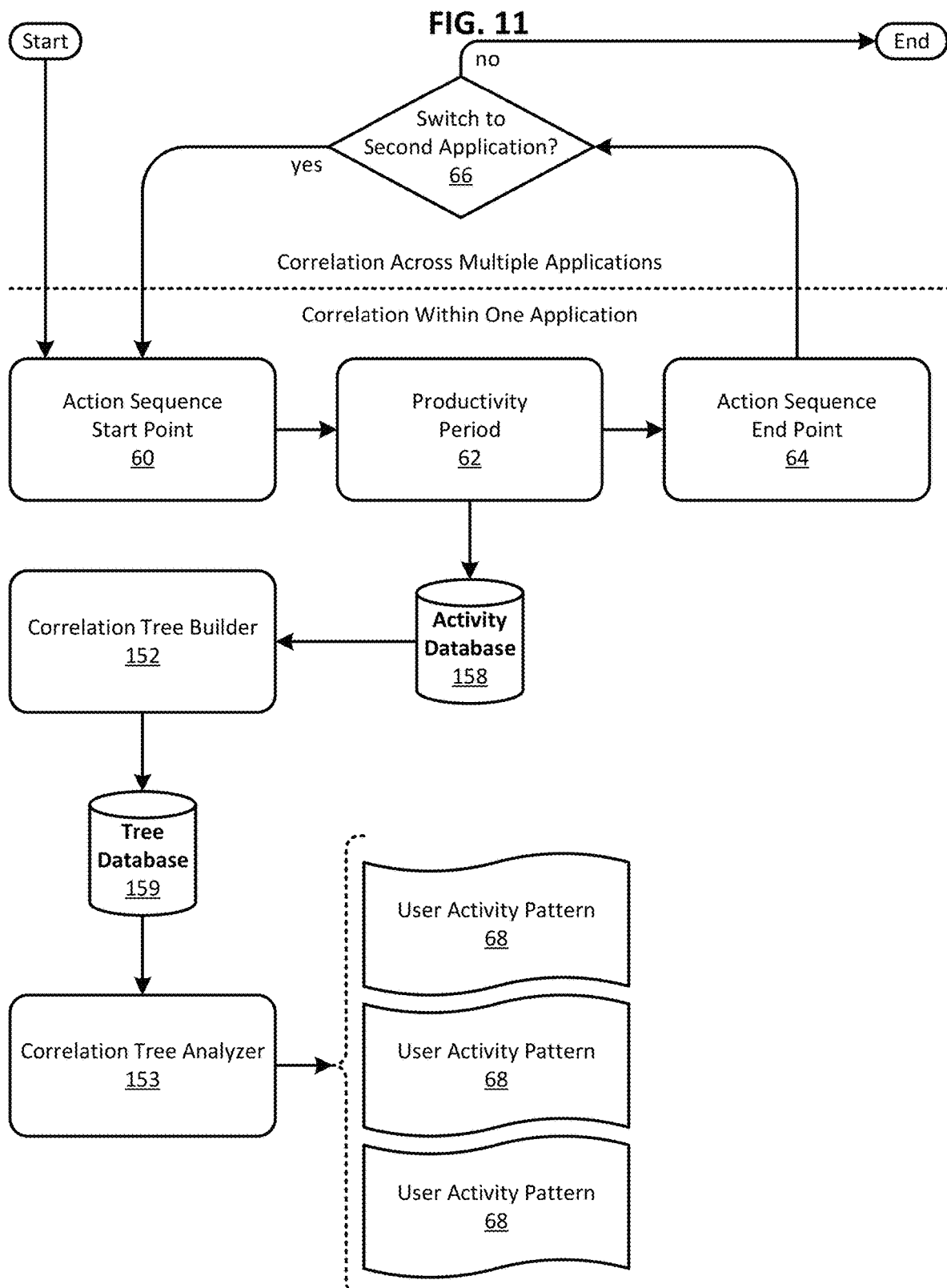
FIG. 11 is a block diagram schematically illustrating an example method for generating microapp functionality recommendations by analyzing user interaction sequences within one or more applications.

FIG. 11 is a block diagram schematically illustrating an overview of example method 3000 for generating microapp functionality recommendations. As discussed in greater detail below, user activity analyzer 151 detects user activity based on an identified action sequence start point 60, action sequence end point 64, and intervening productivity period 62. The detected user activity is stored in activity database 158. At the conclusion of a given action sequence, a determination is made with respect to whether a user switches or liaisons to a second application, as indicated by reference numeral 66. If no such switching occurs, the observed workflow can be understood to have come to a conclusion. If the user does begin using a second application, additional action sequences can be observed and recorded in activity database 158. Correlation tree builder 152 uses the data stored in activity database 158 to build correlation trees that represent the observed action sequences. The generated correlation trees are stored in tree database 159. Correlation tree analyzer 153 analyzes the correlation trees to generate user activity patterns 68 that represent frequently invoked action sequences. These frequently invoked action sequences serve as the basis for generating microapp functionality recommendations. Additional details with respect to the operation of user activity analyzer 151, correlation tree builder 152, and correlation tree analyzer will be provided in turn.

Methodology—Analyzing User Activity

Figure 4:
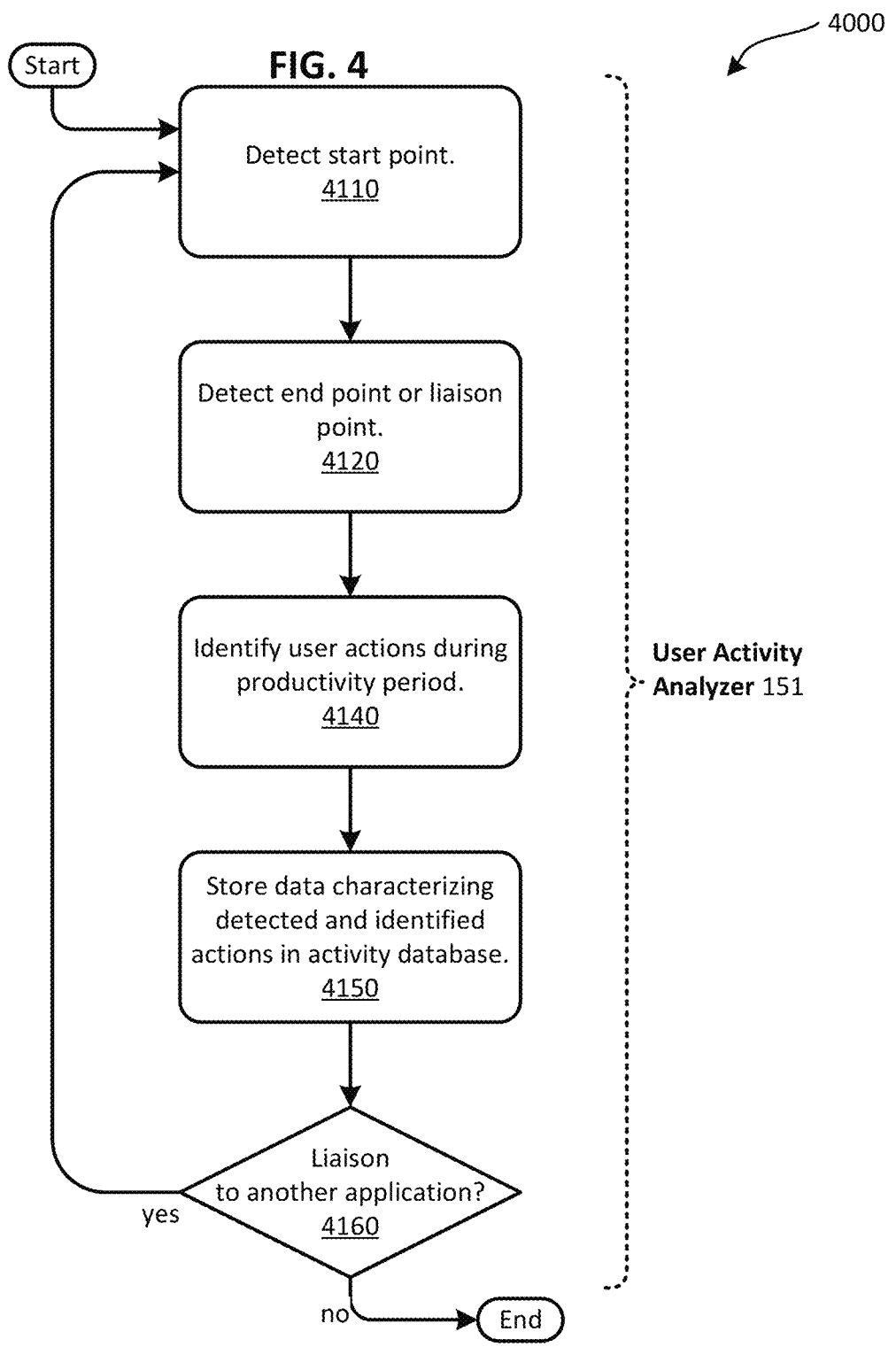
FIG. 4 is a flowchart illustrating an example method for identifying and detecting user interaction sequences within one or more applications.

FIG. 4 is a flowchart illustrating an example user activity analysis operation 4000 that identifies and detects user interaction sequences within one or more applications. Operation 4000 can be implemented, for example, using the system architecture illustrated in FIG. 2 and described herein, and in particular, using user activity analyzer 151. However other system architectures can be used in other implementations. To this end, the correlation of the various functionalities shown in FIG. 4 to user activity analyzer 151 is not intended to imply any structural or use limitations. Rather, other implementations may include, for example, varying degrees of integration wherein certain functionalities are effectively performed by different systems or modules. For example, in an alternative implementation separate software modules are used to detect user activity and store the detected activity in activity database 158. In another implementation a separate software module is used to parse HTTP grammar and commands as a way to detect user activity. Thus other implementations may have fewer or more modules depending on the granularity of a particular implementation. As can be seen, operation 4000 includes a number of phases and sub-processes, the sequence of which may vary from one implementation to another. However, when considered in the aggregate, these phases and sub-processes are capable of detecting and analyzing interactions between a plurality of users and a plurality of application servers 300.

In one example implementation, user activity analysis operation 4000 functions as a background process that monitors interactions between users and their applications on an ongoing basis. The monitored interactions can be understood as comprising a plurality of discrete action sequences, each of which begins with a "start point" that is represented by a particular user interacting with a particular application. Each action sequence ends at an "end point" or "liaison point". An end point refers to a final interaction between the particular user and the particular application, while a liaison point refers to an end point that forms a link to functionality provided by a second application. Thus, while user activity analyzer 151 can be said to monitor interactions between a plurality of users and a plurality of applications in a general sense, at a finer level analyzer 151 can be understood as detecting and recording discrete action sequences between a particular user and a particular application.

To this end, even where user activity analysis operation 4000 can be understood as a continuously executing background process, an example process of detecting and recording a discrete action sequence can be understood as beginning when a start point is detected. See reference numeral 4110 in FIG. 4. In a general sense, a start point can be understood as the point at which a particular user begins a sequence of interactions with a particular application. For example, in one implementation user activity analyzer 151 detects a start point in response to observing a login interaction, such as a user authentication interaction using password authentication, biologic authentication, and/or peer authentication. The login interaction may use proprietary and/or open standard techniques for exchanging authentication data, one example of which is the Security Assertion Markup Language open standard. Analyzer 151 may detect a start point in response to observing a single sign-on (SSO) interaction. The observed SSO interaction may be managed by an identity management provider such as Okta, Inc. (San Francisco, Calif.). User activity analyzer 151 can be configured to detect other types of login interactions in other embodiments.

A user's browser activity may additionally or alternatively form the basis for detecting a start point. For instance, in one implementation a user's action in inputting a target uniform resource locator (URL) is detected as a start point. A URL can be input manually, via a saved bookmark, via redirection from another URL, or via a SaaS application launched from a digital workspace.

As noted above, a discrete action sequence can be understood as beginning with a start point and ending at an end point or liaison point. Thus in one embodiment after detecting the start point, user activity analyzer 151 detects an end point or liaison point. See reference numeral 4120 in FIG. 4. The end point or liaison point can be detected using techniques that are similar to those used to detect the start point. An end point can be detected as having occurred when a user completes a sequence of actions without switching context from a first application. A liaison point, on the other hand, can be detected as having occurred when a user completes a sequence of actions using a first application, obtains results or other data from that first application, and then switches context to a second application. After switching context, the user may initiate a second discrete action sequence in the second application using the results or other data obtained from the first application.

For example, in one implementation user activity analyzer 151 detects an end point or liaison point in response to observing a logoff action, browser page close action, submission complete action, or other substantially similar user action. In other implementations, the end point or liaison point can be detected in response to an application page, browser tab, or other focused user interface detecting a "timeout" or other designated period of inactivity. In still other implementations analyzer 151 detects an end point or liaison point in response to observing certain actions associated with a clipboard, such as a string copy command (for example, when a user copies a purchase order identifier or when a user copies a service ticket), a file copy command (for example, when a user downloads a file or when a user saves a file to a local or cloud-based storage resource), or a URL copy command.

Analyzer 151 optionally includes a sub-module capable of parsing HTTP grammar and commands as a way to detect an end point or liaison point. For example, an end point or liaison point can be detected in response to observing an HTTP command that returns code, posts data, gets data, or returns a content type identifier. Such a sub-module is optionally capable of parsing the body of HTTP commands to identify particular strings which are indicative of an end point or liaison point, such as "goodbye" or "task completed". A browser plugin is additionally or alternatively used to detect user interactions with a web browser.

User activity analyzer 151 can be understood as detecting and recording a discrete action sequence that begins with the detected start point and ends with the detected end point or liaison point. Between the start and end of the action sequence is a "productivity period". User activity analysis operation 4000 further includes identifying user actions during this productivity period. See reference numeral 4140 in FIG. 4. Analyzer 151 can be configured to detect and identify any relevant user actions occurring during the productivity period. Examples of such actions include, but are not limited to, page open operations; browser tab open operations; window open operations; user input operations (including, for example, motion input provided via a pointing device and textual input provided via a keyboard); refocusing actions that cause a particular window or interface to become active (also referred to as context-switching actions); and clipboard actions, such as a paste command associated with a source of the pasted content. It will be appreciated that the foregoing list is provided by way of example, and that, in general, any relevant detectable action can be identified during the productivity period. In some cases detected user input can be characterized in terms of a rate of detected actions per time period, and the productivity period can be understood as continuing until the rate of detected actions falls below an established threshold.

FIG. 4 illustrates a sequence of operations where a start point and end point (or liaison point) are detected before user actions in the productivity period are identified. This can be accomplished by analyzing a recoded log of user activity, where the start point and end point (or liaison point) are identified in an initial operation, and then intervening actions in the productivity period are identified in a subsequent operation. However, it will be appreciated that these operations can be invoked in a different sequence in other implementations. For example, in an alternative implementation a start point is identified first, actions in the productivity period are identified, and then an end point (or liaison point) is detected. Thus it should be appreciated that the example sequence of operations illustrated in FIG. 4, and the sequence in which such operations are described in this application, are not limiting.

A wide range of existing instrumentation, telemetry, and business insight generation platforms are capable of capturing most or all browser activities. One example of such a platform is Citrix Insight Services provided by Citrix Systems, Inc. (Ft. Lauderdale, Fla.). A wide range of browser plugins are also capable of detecting a user's browser activity. Likewise a sub-module capable of parsing HTTP grammar and commands can be used to detect a start point, an end point (or a liaison point), and/or other intervening user activity. Any suitable existing or subsequently developed tools such as these can be used to detect a start point, an end point or liaison point, and user actions in an intervening productivity period. In addition, as noted above, a recorded log of user activity may additionally or alternatively be used to detect and identify relevant user actions. Such a user activity log may be configured to record any of the various actions disclosed herein, as well as other relevant actions, including user shortcut actions. In some cases user actions may be derived or abstracted from established business workflows.

In an example implementation, data that characterizes a detected start point, a detected end point or liaison point, and relevant intervening user actions can be stored in activity database 158. See reference numeral 4150 in FIG. 4. This storage operation optionally occurs any time after the relevant data is acquired. Thus, for example, in an alternative embodiment data characterizing a start point is stored in activity database 158 immediately after the start point is detected. As noted above, user activity analysis operation 4000 can be understood as a continuously executing background process that monitors interactions between users and their applications. Thus, after the relevant data is stored, a determination can be made with respect to whether the observed user liaisons to a second application. See reference numeral 4160 in FIG. 4. If so, for example in a case where the discrete action sequence ends with a liaison point, another discrete action sequence can be analyzed. If not, operation 4000 can be understood as ending, at least with respect to one discrete action sequence. In a broader sense, operation 4000 can be understood as terminating with respect to one discrete action sequence, while continuing to monitor and analyze other interactions between a user and an application.

Methodology—Building Correlation Trees

Figure 5:
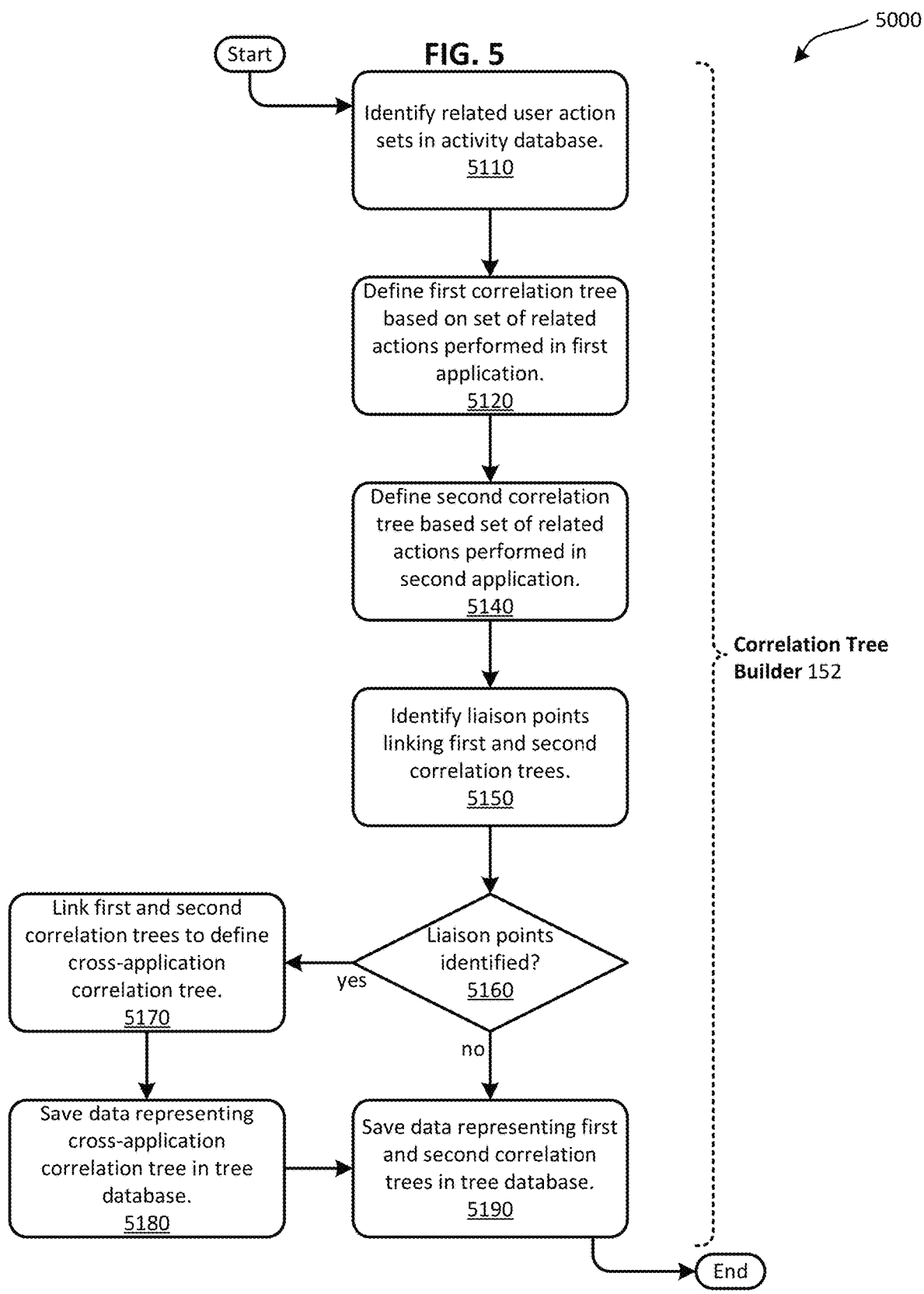
FIG. 5 is a flowchart illustrating an example method for building and linking correlation trees that represent user interaction sequences within one or more applications.

FIG. 5 is a flowchart illustrating an example correlation tree generation operation 5000 that builds and links correlation trees that represent observed user interaction sequences within one or more applications. Operation 5000 can be implemented, for example, using the system architecture illustrated in FIG. 2 and described herein, and in particular, using correlation tree builder 152. However other system architectures can be used in other implementations. To this end, the correlation of the various functionalities shown in FIG. 5 to correlation tree builder 152 is not intended to imply any structural or use limitations. Rather, other implementations may include, for example, varying degrees of integration wherein certain functionalities are effectively performed by different systems or modules. For example, in an alternative implementation separate software modules are used to define a correlation tree and identify liaison operations that can link correlation trees. Thus other implementations may have fewer or more modules depending on the granularity of a particular implementation. As can be seen, operation 5000 includes a number of phases and sub-processes, the sequence of which may vary from one implementation to another. However, when considered in the aggregate, these phases and sub-processes are capable of detecting and analyzing interactions between a plurality of users and a plurality of application servers 300.

In one example implementation, correlation tree generation operation 5000 functions as a background process that monitors recorded user activity, such as user activity recorded in activity database 158. In some cases operation 5000 is invoked when new data is recorded in activity database 158, although other triggers may be used in other embodiments. For example, in an alternative implementation operation 5000 is invoked on a periodic basis or is invoked in response to a user command, such as a command invoked by an administrator of digital workspace server 200. Regardless of the triggering event or condition, correlation tree generation operation 5000 begins when related user action sets are identified in activity database 158. See reference numeral 5110 in FIG. 5. A set of actions may be related by the fact that, collectively, the actions represent one or more action sequences taken by a particular user interacting with a particular application. A set of related actions is thus understood as being correlated with a particular application. The actions may be related by virtue of at least one action that links multiple action sequences, such as a common starting point (for example, an initial user authentication operation). The related actions may therefore include multiple sequences of actions, at least some of which are mutually exclusive. Such mutual exclusivity may occur where, for example, a user must choose between two mutually exclusive actions (for instance, delete or save a data object).

A first correlation tree can then be defined based on a set of related actions performed in a first application. See reference numeral 5120 in FIG. 5. Likewise a second correlation tree can be defined based on a set of related actions performed in a second application. See reference numeral 5140 in FIG. 5. In general, a correlation tree can be built by defining a node for each user action in the set of related actions, wherein sequential actions (that is, nodes) are linked by an edge. Examples of actions that can be represented by a node include a mouse click action, a URL selection action, a button selection action, a data entry action, and a data generation action. The observed user actions, as recorded in activity database 158, can be correlated into discrete action sequences. These identified action sequences can be used to define one or more correlation trees. The defined correlation trees can be embodied in a data structure stored in a computer readable medium. A correlation tree need not be, and indeed in many implementations will not be, rendered or displayed in a human-readable format.

FIG. 7 illustrates a single-application correlation tree that represents example user interaction sequences within a Jira application 20. Jira is a proprietary issue tracking software product developed by Atlassian (Sydney, Australia). The correlation tree illustrated in FIG. 7 includes a plurality of nodes, each of which corresponds to an observed user interaction (that is, action) with Jia application 20. Example actions include "create epic" (represented by node 21), "change assignees of linking stories" (represented by node 22), "search stories" (represented by node 23), "link story to epic" (represented by node 24), "change story assignee" (represented by node 25), "send email notification" (represented by node 26), and "copy epic URL to clipboard" (represented by node 27). The example correlation tree illustrated in FIG. 7 can be generated based on observed interactions between one or more users with Jira application 20, as identified and detected using the user activity analysis techniques disclosed herein. However, it will be appreciated that correlation trees can also be generated from data collected using other data collection and monitoring techniques. The nodes are connected by directional edges, wherein a sequence of connected nodes represents a sequence of actions performed by a user interacting with Jira application 20.

For example, consider a user of Jira application 20 who has curated a large quantity of stories. The user wishes to create an epic and link some of the existing stories to the newly created epic. First, the user logs into Jira application 20 and creates an epic by entering relevant data, as represented by node 21. Next, the user searches for relevant stories, as represented by node 23. Finally the user opens a web browser tab for a selected story and modifies the selected story to link it to the newly created epic, as represented by node 24. The resulting sequence of actions "create epic", "search stories", and "link story to epic" can be seen as a series of nodes connected by edges in the correlation tree illustrated in FIG. 7. Other action sequences are possible, such as when a user changes the assignee for a story after performing a search (as represented by node 25) or when a user changes the assignee of a linking story after creating the new epic (as represented by node 22). Yet another possible action sequence occurs when a user inputs description applicable to all linked stories after creating the new epic.

In these examples, the first action in the sequence ("create epic") can be understood as a start point. Likewise, the last action in each sequence ("change assignees of linking stores", "link story to epic", or "link story to epic") can be understood as an end point or a liaison point. An end point specifically refers to the last action in a workflow that is limited to a single application. For example, "send email notification" can be understood as being an end point that is reached after a new epic is created. In the example correlation tree illustrated in FIG. 7, one node ("copy epic URL to clipboard") is identified as a liaison point that serves as a link to functionality provided by a second application, as will be discussed in turn. The correlation tree can be generated by correlating the observed user activities based on the various sequences in which the activities were observed as having occurred.

Correlation tree generation operation 5000 continues with identifying liaison points that link the first and second correlation trees. See reference numeral 5150 in FIG. 5. A liaison point can be understood as linking functionality provided by a first application (as represented by the first correlation tree) and functionality provided by a second application (as represented by the second correlation tree). For example, FIG. 8 illustrates a cross-application correlation tree that represents example user interaction sequences within both Jira application 20 and a Git application 30. In addition to the nodes illustrated in FIG. 7, the cross-application correlation tree further includes nodes representing the actions "create Git branch by pasting epic URL" (represented by node 31), "switch local repository to new branch" (represented by node 32), and "update readme" (represented by node 33).

Consider the aforementioned user of Jira application 20. Upon creating the new epic, the user is able to copy a URL and/or ticket identifier for the new epic. The user then opens Git application 30, creates a new branch, and pastes the copied epic URL and/or ticket identifier into the newly created branch. This action in the Git application is represented by node 31 in FIG. 8. In this example, Jira application 20 provides functionality to copy an epic URL and/or ticket identifier to a clipboard, and Git application 30 provides functionality to create a Git branch using the epic URL as pasted from the clipboard. This establishes a correlation between user activities in Jira application 20 and Git application 30. More specifically, these applications are correlated as a result of observing that the user has copied content from Jira application 20 and pasted that content in Git application 30. The copy-paste operation and associated copied content (the epic URL or ticket identifier) provide the link that establishes the correlation between the two applications and additionally, that establishes node 27 as a liaison point for creating a cross-application correlation tree.

While FIG. 8 illustrates an example cross-application correlation tree based on a user copying an epic URL and/or ticket identifier into a new Git branch, it will be appreciated that this functionality is disclosed as only one example of an essentially unlimited range of functionalities that can link two or more applications. For example, in another implementation a user accesses a travel reservation using an email application, copies a confirmation number, and pastes the confirmation number into a financial manager to effect payment for the travel reservation. More generally, when data passes from one application to another as part of an overarching workflow, a cross-application correlation tree can be used to represent the functionality provided by such workflow. Other examples of actions that can serve as liaison points between two applications include, but are not limited to, application input and output (such as a Jira-generated URL for a new epic), application content (such as a Jira ticket identifier), and tightly-coupled user actions (such as copy-paste actions and file transfer applications).

While node 27 is provided as a liaison point in the example correlation trees illustrated in FIGS. 7 and 8, in alternative implementations node 27 may not be a liaison point, such as in a workflow where the copied URL is pasted within the same Jira application 20, for example within a subpage within Jira application 20. Thus whether a given action is identified as a liaison point may depend on whether subsequently observed actions are performed within a same or different application.

Identifying liaison points serves as the basis for linking functionality between different applications, and thus for generating cross-application correlation trees. In general, when a user completes a sequence of actions in a first application, this can be understood as resulting in output data, such as file data copied into a clipboard or other data structure. The user then moves to a second application and performs additional actions using the data generated by the first application. An example of this is represented by the copy-paste operations that link Jira application 20 and Git application 30 illustrated in FIG. 8. User activity can be correlated across multiple applications when the same data exists in the multiple applications. The resulting cross-application correlation tree can be understood as existing in a workspace that is independent of any one application. User behavior is therefore learned by identifying end points and liaison points based on observed workflows, and in particular, can be learned without focusing on user interactions with any one application. While FIG. 8 illustrates an example cross-application correlation tree linking functionality provided by Jira application 20 and Git application 30, in general any suitable number of applications may be linked in a cross-application correlation tree.

In some cases no liaison points may be identified, such as where a sequence of actions forms an independent workflow that exists within a single application, and which does not link to functionality provided by other applications. Thus, a determination is made with respect to whether any liaison are identified. See reference numeral 5160 in FIG. 5. If a liaison point is identified, the first and second correlation trees can be linked to define a cross-application correlation tree. See reference numeral 5170 in FIG. 5. As noted above, FIG. 8 illustrates an example of a cross-application correlation tree. It is not necessary to actually render the cross-application correlation tree in a human-readable format. Data representing the cross-application correlation tree can then be saved in tree database 159. See reference numeral 5180 in FIG. 5. If no liaison point between the first and second correlation trees is identified, then data representing the first and second correlation trees can be saved in tree database 159. See reference numeral 5190 in FIG. 5. In some cases data representing the first and second correlation trees as distinct elements is saved in tree database 159 even in cases were a liaison point is identified, although this is not required. The data used to represent a correlation tree can be saved in, for example, a distributed memory structure, a relational database, or any other suitable data structure.

In an alternative implementation correlation tree generation operation 5000 is modified to define and save a single correlation tree. In such implementations individual correlation trees can be defined and saved in an initial operational phase, and liaison points linking the defined correlation trees can be identified in a subsequent operational phase. It should therefore be appreciated that the sequence of operations illustrated in FIG. 5 can be modified in other implementations.

Methodology—Analyzing Correlation Trees

Figure 6:
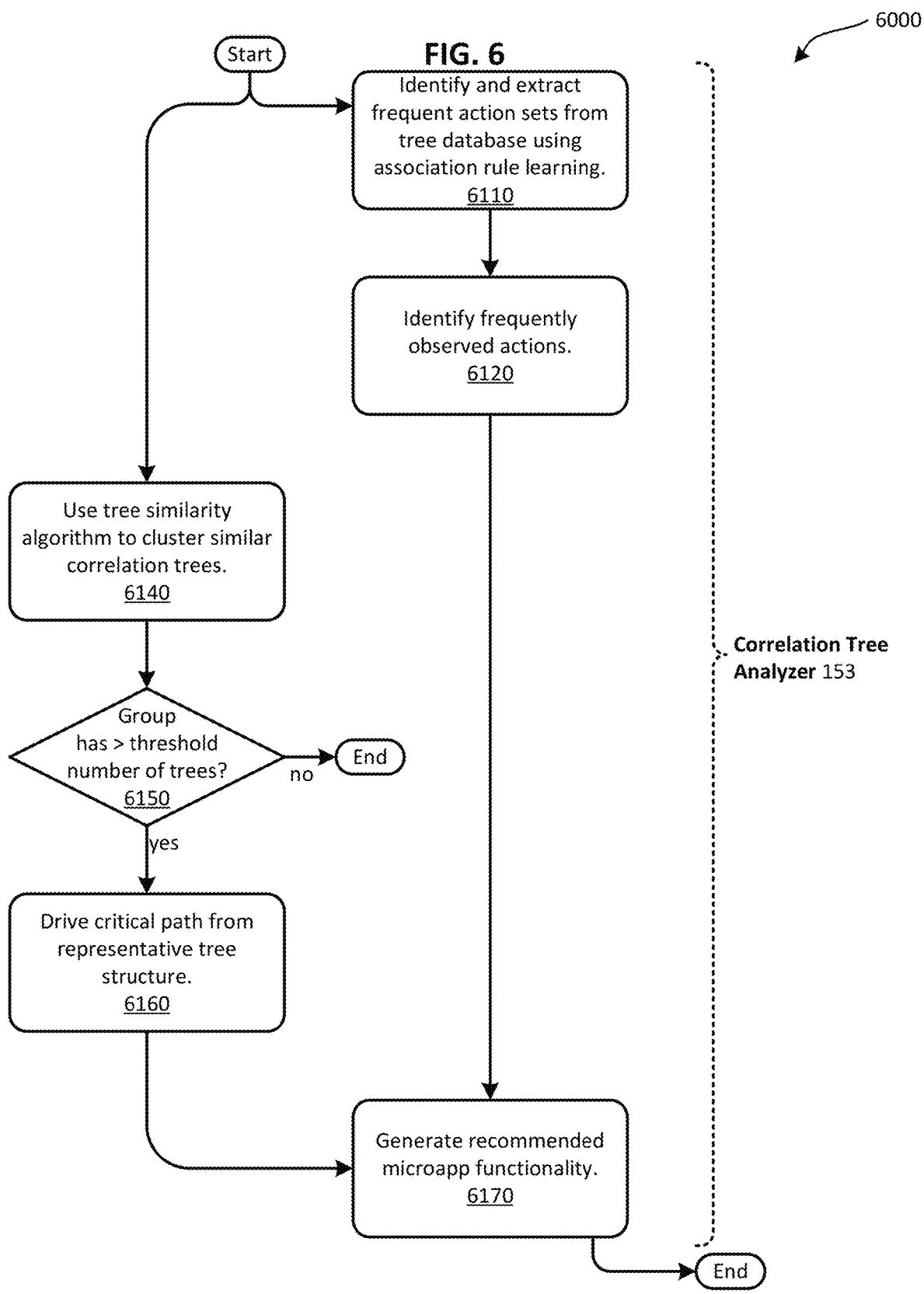
FIG. 6 is a flowchart illustrating an example method for analyzing correlation trees to identify frequently invoked user actions and action sequences within one or more applications.

FIG. 6 is a flowchart illustrating an example correlation tree analysis operation 6000 that analyzes a collection of correlation trees to identify frequently invoked user actions and action sequences within one or more applications. Operation 6000 can be implemented, for example, using the system architecture illustrated in FIG. 2 and described herein, and in particular, using correlation tree analyzer 153. However other system architectures can be used in other implementations. To this end, the correlation of the various functionalities shown in FIG. 6 to correlation tree analyzer 153 is not intended to imply any structural or use limitations. Rather, other implementations may include, for example, varying degrees of integration wherein certain functionalities are effectively performed by different systems or modules. For example, in an alternative implementation separate software modules are used to extract frequent action sets from tree database 159 and to cluster similar correlation trees. Thus other implementations may have fewer or more modules depending on the granularity of a particular implementation. As can be seen, operation 6000 includes a number of phases and sub-processes, the sequence of which may vary from one implementation to another. However, when considered in the aggregate, these phases and subprocess are capable of detecting and analyzing interactions between a plurality of users and a plurality of application servers 300.

In one example implementation, correlation tree analysis operation 6000 functions as a background process that monitors a data structure having data representing a plurality of correlation trees, such as tree database 159. In some cases operation 6000 is invoked when new data is recorded in tree database 159, although other triggers may be used in other implementations. For example, in an alternative implementation operation 6000 is invoked on a periodic basis or is invoked in response to a user command, such as a command invoked by an administrator of digital workspace server 200. Regardless of the triggering event or condition, in one implementation correlation tree analysis operation 6000 begins when frequent action sets are identified and extracted from tree database 159 using association rule learning. See reference numeral 6110 in FIG. 6. This is illustrated schematically in FIG. 9, where user activities 50, represented by a plurality of correlation trees 50a stored in tree database 159, are processed using association rule learning 52 to generate a plurality of frequent action sets 54. Frequent action sets 54 may form the basis for recommended microapp functionality, and in particular, may form part of a critical path that extends across multiple applications connected by one or more liaison points.

As noted above, in certain implementations the frequent action sets are identified using association rule learning. Association rule learning refers to a class of machine learning techniques that are capable of discovering relationships between variables in a large dataset, and particularly relevant to this disclosure, for finding the most frequent and/or relevant patterns in such a dataset. In the context of analyzing a collection of correlation trees 50a, association rule learning can be used to infer a causal relationship between individually observed user actions. For example, association rule learning can be used to infer that when a user is observed to have invoked the sequence activity-1→activity-2→activity-3, then it is likely that the user will next invoke activity-4. Many different algorithms have been developed for generating association rules, including the frequent pattern growth ("FP-growth") algorithm. The identified frequent action sets form the basis for recommending particular microapp functionality and for enabling microapp builder 154 to implement the recommended functionality.

Figure 9:
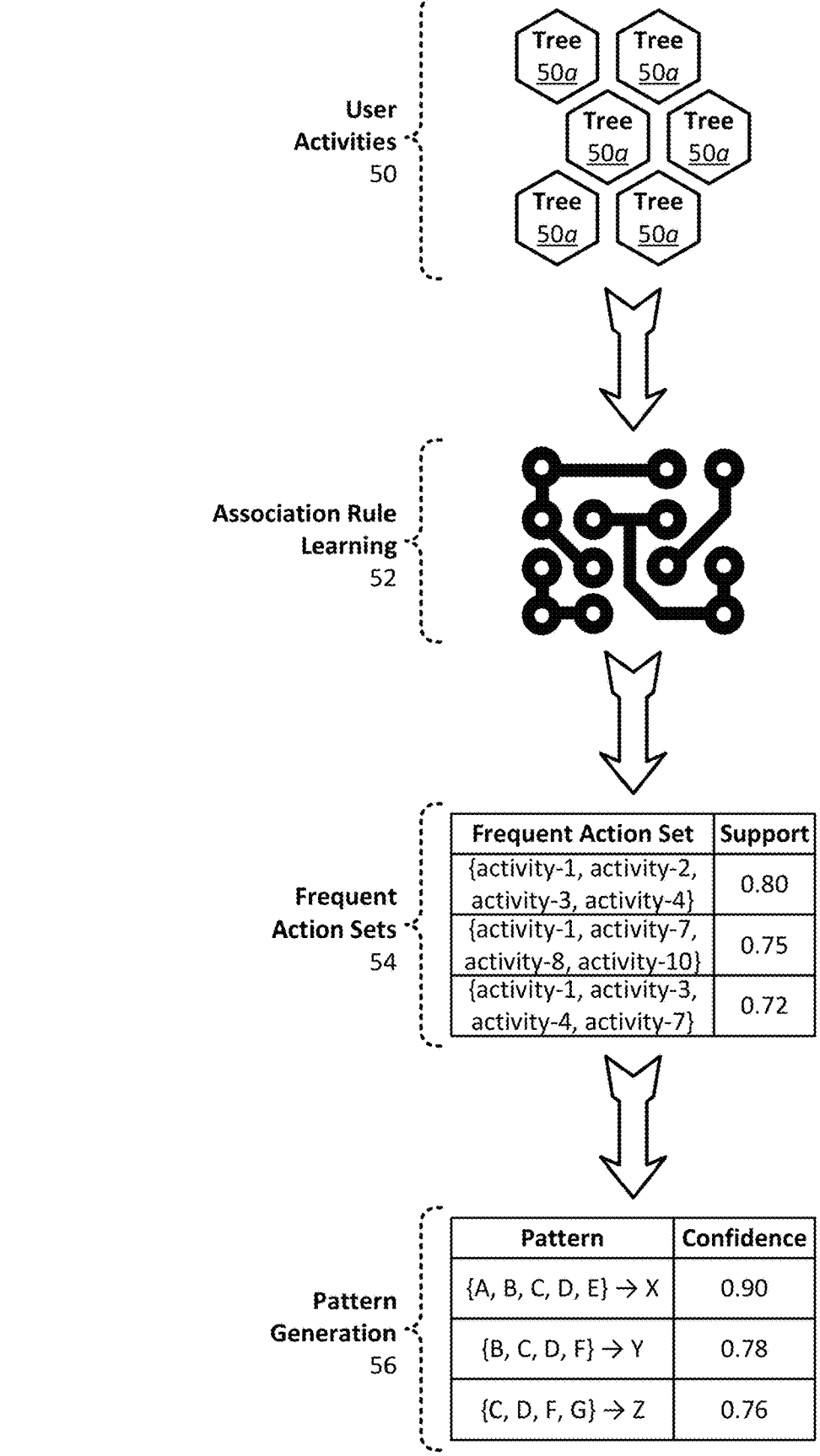
FIG. 9 is a block diagram schematically illustrating an example of identifying high frequency user interaction sequences from a plurality of correlation trees.

As illustrated in FIG. 9, association rule learning can be used not only to generate frequent action sets 54, but also corresponding support values for the same. Support values represent the frequency at which a particular action set is observed to occur, where a high degree of support represents a frequently observed action set. When a causal relationship is identified, such as where the sequence activity-1→activity-2→activity-3 is predicted to be followed by activity-4, the predicted activity (activity-4 in this example) can be associated with a degree of support. If the causal relationship has a sufficiently high degree of support, for example that exceeds an established threshold, the predicted activity can be identified as a frequently observed action. See reference numeral 6120 in FIG. 6. In this case, the identified frequently observed action can be represented as corresponding to frequently observed actions 14 illustrated in FIG. 1. As noted above, in one implementation the FP-growth algorithm is used to identify frequent action sets 54 and their corresponding support values. The frequently observed actions can be used to generate recommended microapp functionality that is ultimately provided to microapp builder 154. See reference numeral 6170 in FIG. 6.

Association rule learning, including frequent pattern discovery techniques such as the aforementioned FP-growth algorithm, can also be used that derive patterns from frequent action sets 54, as represented by pattern generation 56 illustrated in FIG. 9. These patterns represent a critical path that extends across multiple applications when actions in the multiple applications are concatenated. Each identified pattern is optionally associated with the corresponding confidence value.

Figure 10:
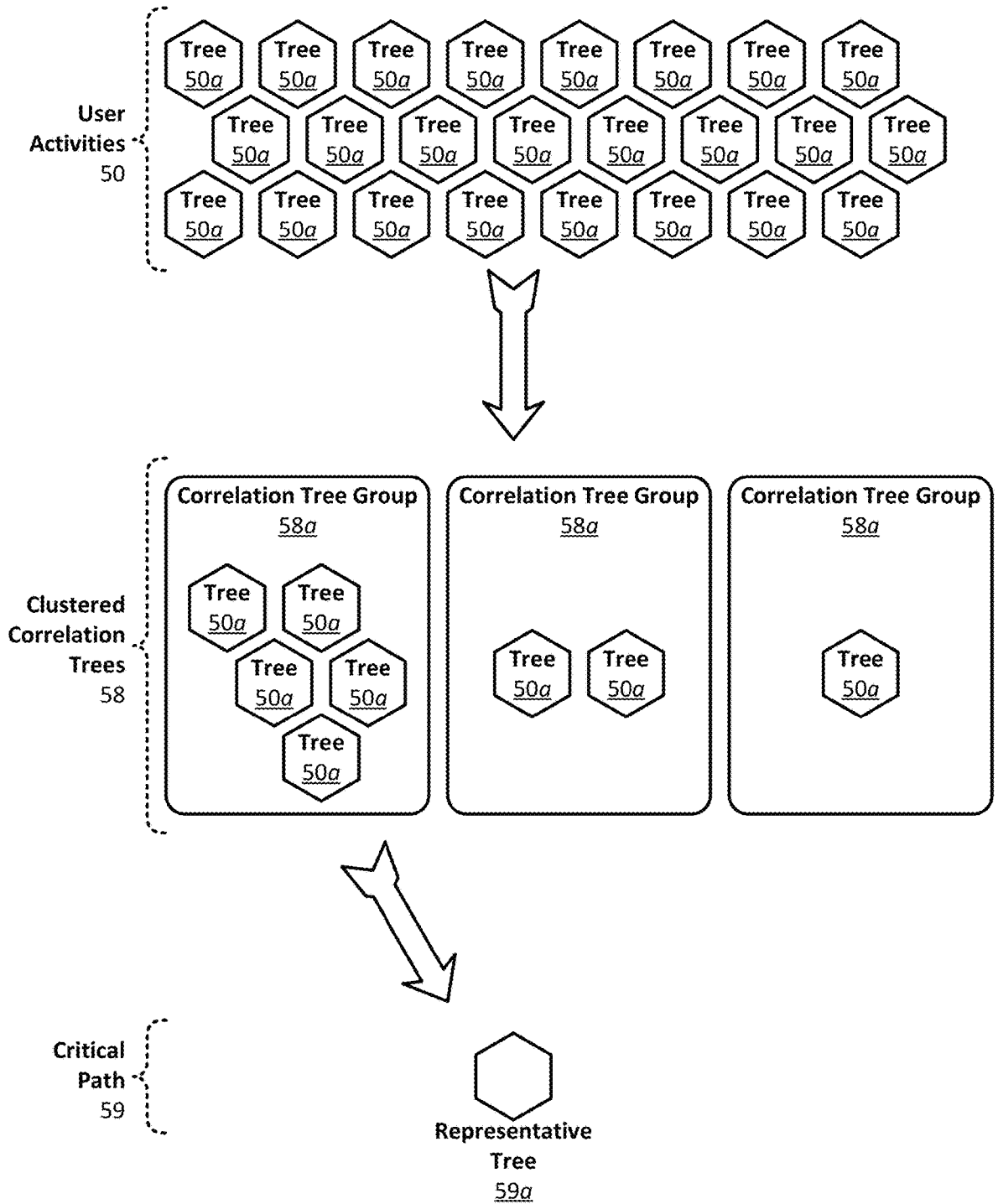
FIG. 10 is a block diagram schematically illustrating an example of identifying a critical path that represents a user interaction sequence that can form the basis for recommended microapp functionality.

In addition to using correlation trees to identify frequently observed actions, correlation trees can also be used to identify a critical path and corresponding liaison points that represent a user interaction sequence that forms the basis for recommended microapp functionality. Thus, in alternative embodiments operation 6000 begins when a tree similarity algorithm is used to cluster similar correlation trees. See reference numeral 6140 in FIG. 6. This is illustrated schematically in FIG. 10, where user activities 50, represented by a plurality of correlation trees 50a stored in tree database 159, are processed using a tree similarity algorithm to generate a plurality of correlation tree groups 58a. Correlation tree groups 58a can be collectively referred to as clustered correlation trees 58.

One example of a tree similarity algorithm that can be used in this regard is disclosed in Xu, "An Algorithm for Comparing Similarity Between Two Trees", thesis submitted in partial fulfillment of the requirements for the degree of Master of Science in the Department of Computer Science in the Graduate School of Duke University, submitted 13 Aug. 2015, retrieved from <https://arxiv.org/pdf/1508.03381.pdf>. Other suitable existing or subsequently developed tree similarity algorithms can be used in other embodiments. At a high level, this algorithm can be understood as calculating a distance between two trees, wherein similar trees are separated by a shorter distance. For example, consider Trees A, B, C and D, where distance $d_{ij}$ separates trees i and j. If $d_{AB}$ and $d_{CD}$ are both less than $d_{AC}$ and $d_{BD}$, then it can be concluded that (a) Trees A and B are similar to each other and thus should be clustered together, and (b) Trees C and D are similar to each other and thus should be clustered together.

Once clustered correlation trees 58 are organized using a tree similarity algorithm, a determination can be made with respect to whether a particular correlation tree group 58*a* includes greater than a threshold number of correlation trees. See reference numeral 6150 in FIG. 6. If not, any action sequence corresponding to the grouped correlation trees is understood as being too infrequently invoked to support a microapp functionality recommendation. On the other hand, if correlation tree group 58*a* includes greater than the threshold number of correlation trees then a critical path 59 can be derived from a representative tree 59*a* of the sufficiently-large correlation tree group 58*a*. See reference numeral 6160 in FIG. 6. In one implementation, representative tree 59*a* is defined by common nodes from the sufficiently-large correlation tree group 58*a*. Critical path 59 can be used to generate recommended microapp functionality that is ultimately provided to microapp builder 154. See reference numeral 6170 in FIG. 6.

Once the recommended microapp functionality has been defined, such recommendations can be passed to microapp builder 154. Microapp builder 154 is configured to build microapps and/or recommend microapp functionality based on the frequently invoked actions and/or action sequences. Microapps can be generated automatically and/or recommendations can be made to an administrator who makes a final decision with respect to what microapp functionality will ultimately be deployed, for example via a digital workspace. This allows microapp functionality to be developed from a large number of users working in a diverse range of use contexts, thus allowing application usage patterns to be identified in a way that could be difficult or even impossible for a human analyst. This also allows microapp functionality recommendations to be specifically tailored to a specific role and the application usage patterns associated with that role. Accurately making individually-tailed microapp recommendations may not be feasible for a human analyst, particularly in a large organization. Microapp functionality that is closely tailored to the needs of particular users and particular workgroups ultimately will lead to improved user experience and productivity.

CONCLUSION

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims. In addition, the phraseology and terminology used herein is for the purpose of description and should not be regarded as limiting. Any references to examples, components, elements, or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms.

We claim:

1. A method for generating microapp recommendations, the method comprising:
   receiving observational data that characterizes interactions between a plurality of users and a plurality of applications;
   defining a set of correlation trees based on the received observational data, wherein each correlation tree in the set represents a sequence of interactions between one of the users and one or more of the applications, and wherein the set includes a first quantity of correlation trees;
   identifying a subset of similar correlation trees, each of which is included in the set, wherein the subset includes a second quantity of correlation trees that is less than the first quantity;
   making a determination that the second quantity is greater than a threshold quantity; and
   in response to making the determination, generating a microapp recommendation based on the sequence of interactions represented by a correlation tree that is representative of the subset.

2. The method of claim 1, wherein generating the microapp recommendation further comprises generating machine-readable instructions, that when executed, cause the sequence of interactions represented by the representative correlation tree to be invoked.

3. The method of claim 1, further comprising:
   extracting a plurality of frequent action sets from the set of correlation trees;
   identifying a causal relationship between a particular one of the frequent action sets and a subsequent frequent action, wherein the subsequent frequent action is associated with a confidence parameter that represents how often the subsequent frequent action follows the particular frequent action set; and
   in response to determining that the confidence parameter exceeds a threshold confidence, generating a microapp recommendation that includes the subsequent frequent action.

4. The method of claim 1, wherein the sequence of interactions represented by a particular one of the correlation trees in the set includes a user authentication interaction, a user data entry action, and a logoff interaction.

5. The method of claim 1, wherein identifying the subset of similar correlation trees further comprises:
   identifying a centroid of the similar correlation trees in the subset; and
   determining distances between each of the similar correlation trees in the subset and the centroid, wherein each of the distances is less than a threshold distance.

6. The method of claim 1, further comprising determining distances between a particular one of the similar correlation trees in the subset and each of the other similar correlation trees in the subset, wherein each of the distances is less than a threshold distance.

7. The method of claim 1, wherein the set of correlation trees includes:
   a single-application correlation tree that represents a sequence of interactions between one of the users and one of the applications; and
   a cross-application correlation tree that represents a sequence of interactions between one of the users and at least two different applications.

8. The method of claim 1, further comprising:
   identifying a liaison point that links two of the correlation trees in the set, wherein the two linked correlation trees represent functionality provided by first and second applications, and wherein the liaison point represents data passing from the first application to the second application;
   generating a cross-application correlation tree that represents a sequence of interactions between one of the users and the first and second applications; and
   including the cross-application correlation tree in the defined set of correlation trees.

9. The method of claim 1, further comprising identifying a liaison point that links two of the correlation trees in the set, wherein the two linked correlation trees represent functionality provided by first and second applications, and wherein the liaison point represents a copy operation in the first application and a paste operation in the second application.

10. A system that comprises a digital workspace server, wherein the digital workspace server includes a memory and at least one processor coupled to the memory, and wherein the digital workspace server is configured to generate microapp recommendations by:
   receiving observational data that characterizes interactions between a plurality of users and a plurality of applications;
   defining a set of correlation trees based on the received observational data, wherein each correlation tree in the set represents a sequence of interactions between one of the users and one or more of the applications;
   extracting a plurality of frequent action sets from the set of correlation trees;
   identifying a causal relationship between a particular one of the frequent action sets and a subsequent frequent action, wherein the subsequent frequent action is associated with a confidence parameter that represents how often the subsequent frequent action follows the particular frequent action set; and
   in response to determining that the confidence parameter exceeds a threshold confidence, generating a microapp recommendation that includes the subsequent frequent action.

11. The system of claim 10, wherein:
   the digital workspace server is further configured to generate microapp recommendations by linking two of the defined correlation trees;
   a first one of the linked correlation trees includes a liaison point that represents a first action taken with respect to a data element; and
   a second one of the linked correlation trees includes a second action taken with respect to the data element.

12. The system of claim 10, wherein the digital workspace server is further configured to generate microapp recommendations by:
   identifying a subset of similar correlation trees, each of which is included in the set;
   making a determination that there are more than a threshold quantity of correlation trees in the subset; and
   in response to making the determination, generating a microapp recommendation based on the sequence of interactions represented by a correlation tree that is representative of the subset.

13. The system of claim 10, wherein generating the microapp recommendation further comprises displaying, in a user interface, a representation of the subsequent frequent action.

14. The system of claim 10, wherein each frequent action set is associated with a support parameter that represents a frequency with which the frequent action set is observed.

15. A non-transitory computer readable medium storing processor executable instructions to generate microapp recommendations, the processor executable instructions comprising instructions to:
   receive observational data that characterizes interactions between a plurality of users and a plurality of applications;
   define a set of correlation trees based on the received observational data, wherein each correlation tree in the set represents a sequence of interactions between one of the users and one or more of the applications, and wherein the set includes a first quantity of correlation trees;
   identify a subset of similar correlation trees, each of which is included in the set, wherein the subset includes a second quantity of correlation trees that is less than the first quantity;
   make a determination that the second quantity is greater than a threshold quantity; and
   in response to making the determination, generate a microapp recommendation based on the sequence of interactions corresponding to a correlation tree that is representative of the subset.

16. The non-transitory computer readable medium of claim 15, wherein the processor executable instructions further comprise instructions to:
   identify start and end points of a particular sequence of interactions; and
   identify a plurality of user actions occurring between the start and end points.

17. The non-transitory computer readable medium of claim 15, wherein the processor executable instructions further comprise instructions to save data representing the set of correlation trees in a tree database.

18. The non-transitory computer readable medium of claim 15, wherein:
   the processor executable instructions further comprise instructions to identify a start point of a particular sequence of interactions; and
   the start point is selected from a group consisting of a user authentication action and a uniform resource locator submission.

19. The non-transitory computer readable medium of claim 15, wherein:
   the processor executable instructions further comprise instructions to identify an end point of a particular sequence of interactions; and
   the end point is selected from a group consisting of a user logoff action, a page close action, and a detected activity timeout event.

20. The non-transitory computer readable medium of claim 15, wherein the processor executable instructions further comprise instructions to:
   identify an end point of a first sequence of interactions;
   identify a start point of a second sequence of interactions;
   identify a data object that is operated on by both the start and end points; and
   in response to identifying the data object, designate the end point of the first sequence of interactions as a liaison point between the first and second sequences.

* * * * *